(12) United States Patent
Nakada et al.

(10) Patent No.: US 10,677,136 B2
(45) Date of Patent: Jun. 9, 2020

(54) INTERNAL COMBUSTION ENGINE CONTROL DEVICE

(71) Applicant: ISUZU MOTORS LIMITED, Tokyo (JP)

(72) Inventors: Teruo Nakada, Yokohama (JP); Takayuki Sakamoto, Fujisawa (JP); Daiji Nagaoka, Kamakura (JP)

(73) Assignee: ISUZU MOTORS LIMITED, Tokyo (JP)

(*) Notice: Subject to any disclaimer, the term of this patent is extended or adjusted under 35 U.S.C. 154(b) by 281 days.

(21) Appl. No.: 15/555,356

(22) PCT Filed: Mar. 1, 2016

(86) PCT No.: PCT/JP2016/056205
§ 371 (c)(1),
(2) Date: Sep. 1, 2017

(87) PCT Pub. No.: WO2016/140211
PCT Pub. Date: Sep. 9, 2016

(65) Prior Publication Data
US 2018/0066561 A1 Mar. 8, 2018

(30) Foreign Application Priority Data
Mar. 4, 2015 (JP) .................................. 2015-042700

(51) Int. Cl.
*F01N 9/00* (2006.01)
*F01N 3/20* (2006.01)
(Continued)

(52) U.S. Cl.
CPC ........... *F01N 9/002* (2013.01); *F01N 3/0814* (2013.01); *F01N 3/0842* (2013.01);
(Continued)

(58) Field of Classification Search
CPC .... F01N 11/002; F01N 11/005; F01N 3/0814; F01N 3/0842; F01N 3/0871; F01N 3/103;
(Continued)

(56) References Cited

U.S. PATENT DOCUMENTS 1,919,929 A * 7/1933 Brogan .................... G01L 5/288
73/122
7,766,542 B2 8/2010 Cunningham
(Continued)

FOREIGN PATENT DOCUMENTS

JP 2002-303203 A 10/2002
JP 2006-316757 A 11/2006
(Continued)

OTHER PUBLICATIONS

International Search Report and Written Opinion for PCT App No. PCT/JP2016/056205 dated May 31, 2016, 6 pgs.
(Continued)

*Primary Examiner* — Matthew T Largi
(74) *Attorney, Agent, or Firm* — Procopio, Cory, Hargreaves & Savitch LLP

(57) ABSTRACT

An internal combustion engine control device including an oxidation catalyst heating value estimation unit 88A, a NOx catalyst heating value estimation unit 88B, an oxidation catalyst temperature estimation unit 88C, a NOx catalyst temperature estimation unit 88D, and switches 801, 802, 803 that switch between an enabled state in which processing performed by the oxidation catalyst heating value estimation unit 88A and the oxidation catalyst temperature estimation unit 88C is executed and a disabled state in which the processing performed by the oxidation catalyst heating value estimation unit 88A and the oxidation catalyst temperature
(Continued)

estimation unit 88C is not executed, wherein the control device is configured to be applied to both an exhaust gas purification system including an NOx-occlusion-reduction-type catalyst and an oxidation catalyst and an exhaust gas purification system including the NOx-occlusion-reduction-type catalyst and not including the oxidation catalyst.

4 Claims, 12 Drawing Sheets

(51) Int. Cl.
*F01N 3/36* (2006.01)
*F02D 41/02* (2006.01)
*F01N 11/00* (2006.01)
*F01N 3/08* (2006.01)
*F01N 3/10* (2006.01)

(52) U.S. Cl.
CPC ........... *F01N 3/0871* (2013.01); *F01N 3/103* (2013.01); *F01N 3/20* (2013.01); *F01N 3/36* (2013.01); *F01N 9/00* (2013.01); *F01N 9/005* (2013.01); *F01N 11/002* (2013.01); *F01N 11/005* (2013.01); *F02D 41/0235* (2013.01); *F01N 2610/03* (2013.01); *F01N 2900/1404* (2013.01); *F01N 2900/1602* (2013.01); *F01N 2900/1631* (2013.01); *Y02T 10/47* (2013.01)

(58) Field of Classification Search
CPC ..... F01N 3/20; F01N 3/36; F01N 9/00; F01N 9/002; F01N 9/005; F01N 2610/03; F01N 2900/1404; F01N 2900/1602; F01N 2900/1631; F02D 41/0235

See application file for complete search history.

(56) References Cited

U.S. PATENT DOCUMENTS

| | | | |
|---|---|---|---|
| 9,061,244 B2* | 6/2015 | Girard | B01D 53/9409 |
| 10,036,307 B2* | 7/2018 | Hotta | F02M 26/17 |
| 2005/0022506 A1* | 2/2005 | Nishizawa | F01N 3/0842 |
| | | | 60/276 |
| 2005/0102997 A1* | 5/2005 | Gabe | F01N 3/0814 |
| | | | 60/274 |
| 2009/0019836 A1 | 1/2009 | Nagaoka et al. | |
| 2009/0049824 A1 | 2/2009 | Kojima et al. | |

FOREIGN PATENT DOCUMENTS

| | | | |
|---|---|---|---|
| JP | 2008-202425 A | 9/2008 | |
| JP | 2008-261252 A | 10/2008 | |
| JP | 2009-047086 A | 3/2009 | |
| JP | 2009-127521 A | 6/2009 | |
| JP | 2012-241594 A | 12/2012 | |
| JP | 2013-011231 A | 1/2013 | |

OTHER PUBLICATIONS

Extended European Search Report for related EP App No. 16758904.3 dated Jul. 3, 2018, 8 pgs.

Office Action for related Japanese Patent Application No. 2015-042700 dated Dec. 4, 2018; English translation provided; 4 pages.

* cited by examiner

INTERNAL COMBUSTION ENGINE CONTROL DEVICE

CROSS-REFERENCE TO RELATED APPLICATIONS

This application is a U.S. National Stage entry of PCT Application No. PCT/JP2016/056205, filed on Mar. 1, 2016, which claims priority to Japanese Patent Application No. 2015-042700, filed Mar. 4, 2015, the contents of which are incorporated herein by reference.

TECHNICAL FIELD

The present invention relates to a control device of an internal combustion engine.

BACKGROUND ART

As an exhaust gas after-treatment device configured to treat an exhaust gas emitted from an internal combustion engine, an exhaust gas after-treatment device having a NOx-occlusion-reduction-type catalyst and an exhaust gas after-treatment device having a NOx-occlusion-reduction-type catalyst and an oxidation catalyst have been known (for example, refer to Patent References 1 and 2). The NOx-occlusion-reduction-type catalyst reduces and purifies NOx (nitrogen compound) in the exhaust gas emitted from the internal combustion engine. The oxidation catalyst is arranged at an upstream-side of the NOx-occlusion-reduction-type catalyst and is supplied with unburnt fuel by post injection of an exhaust gas injector or an in-cylinder injector, thereby increasing an exhaust gas temperature.

When the exhaust gas is in a lean atmosphere, the NOx-occlusion-reduction-type catalyst occludes NOx contained in the exhaust gas, and when the exhaust gas is in a rich atmosphere, the NOx-occlusion-reduction-type catalyst detoxifies and releases the occluded NOx with hydrocarbon contained in the exhaust gas by reduction and purification. For this reason, in a case where a NOx occlusion amount of the catalyst reaches a predetermined amount, it is necessary to periodically perform NOx purge of enriching the exhaust gas by post injection or exhaust gas pipe injection so as to recover a NOx occlusion capacity (for example, refer to Patent Reference 1).

Also, sulfur oxide (hereinafter, referred to as 'SOx') contained in the exhaust gas is occluded in the NOx-occlusion-reduction-type catalyst. When a SOx occlusion amount increases, a NOx purification capacity of the NOx-occlusion-reduction-type catalyst is deteriorated. For this reason, in a case where the SOx occlusion amount reaches a predetermined amount, it is necessary to periodically perform SOx purge of supplying unburnt fuel to the upstream oxidation catalyst to increase an exhaust gas temperature to a SOx separation temperature by post injection or exhaust gas pipe injection so as to separate SOx from the NOx-occlusion-reduction-type catalyst for recovery from the sulfur poisoning (for example, refer to Patent Reference 2).

PRIOR ART REFERENCE

Patent Reference

Patent Reference 1: JP-A-2008-202425
Patent Reference 2: JP-A-2009-047086

DISCLOSURE OF THE INVENTION

Problems to be Solved

In general, in an exhaust gas purification system having the above type of device, when performing catalyst regeneration processing such as NOx purge, an exhaust gas pipe injection amount and a post injection amount are controlled in a feedback manner based on a deviation between a target temperature and a catalyst temperature. Here, in a case where the oxidation catalyst is provided in addition to the NOx-occlusion-reduction-type catalyst, it is necessary to implement temperature estimation during the catalyst regeneration processing not only for the NOx-occlusion-reduction-type catalyst but also for the oxidation catalyst, in contrast, in a case where the oxidation catalyst is not provided and the NOx-occlusion-reduction-type catalyst is provided, it is sufficient to implement the temperature estimation during the catalyst regeneration processing only for the NOx-occlusion-reduction-type catalyst. Also, in a case where the oxidation catalyst is provided in addition to the NOx-occlusion-reduction-type catalyst, it is necessary to implement the temperature estimation for both the catalysts, considering heat generations of both the oxidation catalyst and the NOx-occlusion-reduction-type catalyst. In contrast, when the oxidation catalyst is not provided and the NOx-occlusion-reduction-type catalyst is provided, it is not necessary to implement the temperature estimation in such a manner. That is, it is necessary to manufacture different control devices, depending on whether the oxidation catalyst is provided.

An object of a control device of the disclosure is to effectively improve estimation accuracy of a catalyst temperature during catalyst regeneration processing and to save the manufacturing cost.

Means for Solving the Problems

A control device of the disclosure includes: catalyst regeneration means for executing catalyst regeneration processing of enriching exhaust gas to reduce and purify NOx occluded in a NOx-occlusion-reduction-type catalyst; first emission amount storing means for acquiring and storing therein in advance at least one of a hydrocarbon amount and a carbon monoxide amount which is emitted from the internal combustion engine during the execution of the catalyst regeneration processing; first heat generation amount estimation means for estimating at least one of a hydrocarbon heat generation amount and a carbon monoxide heat generation amount in the NOx-occlusion-reduction-type catalyst based on the at least one of the hydrocarbon amount and the carbon monoxide amount which is read from the first emission amount storing means during the execution of the catalyst regeneration processing; first catalyst temperature estimation means for estimating a catalyst temperature of the NOx-occlusion-reduction-type catalyst during the execution of the catalyst regeneration processing based on the at least one of the hydrocarbon heat generation amount and the carbon monoxide heat generation amount estimated by the first heat generation amount estimation means; second emission amount storing means for acquiring and storing therein in advance at least one of a hydrocarbon amount and a carbon monoxide amount emitted from the internal combustion engine during lean operation of the internal combustion engine; second heat generation amount estimation means for, during the execution of the catalyst regeneration processing, estimating at least one of a hydrocarbon heat generation amount and a carbon monoxide heat generation amount in an oxidation catalyst based on the at least one of the hydrocarbon amount and the carbon monoxide amount read from the second emission amount storing means in a case where an execution time period of the catalyst regeneration processing is shorter than a predetermined time period, and estimating the at least one of the hydrocarbon heat generation amount and the carbon monoxide heat generation amount in the oxidation catalyst based on the at least one of the hydrocarbon amount and the carbon monoxide amount read from the first emission amount storing means in a case where the execution time period of the catalyst regeneration processing is equal to or longer than the predetermined time period; second catalyst temperature estimation means for estimating a catalyst temperature of the oxidation catalyst during the execution of the catalyst regeneration processing based on the at least one of the hydrocarbon heat generation amount and the carbon monoxide heat generation amount estimated by the second heat generation amount estimation means; and switching means for switching between an enabled state in which the processing of the second heat generation amount estimation means and the second catalyst temperature estimation means is executed and a disabled state in which the processing of the second heat generation amount estimation means and the second catalyst temperature estimation means is not executed, wherein the control device is configured to be applied to both an exhaust gas purification system including the NOx-occlusion-reduction-type catalyst and the oxidation catalyst and an exhaust gas purification system including the NOx-occlusion-reduction-type catalyst and not including the oxidation catalyst.

Advantageous Effects of Invention

According to the control device of the disclosure, it is possible to effectively improve estimation accuracy of the catalyst temperature during the catalyst regeneration processing and to save the manufacturing cost.

MODE FOR CARRYING OUT THE INVENTION

Hereinafter, an exhaust gas purification system to which a control device in accordance with an illustrative embodiment of the present invention is applied will be described with reference to the accompanying drawings.

Figure 1:
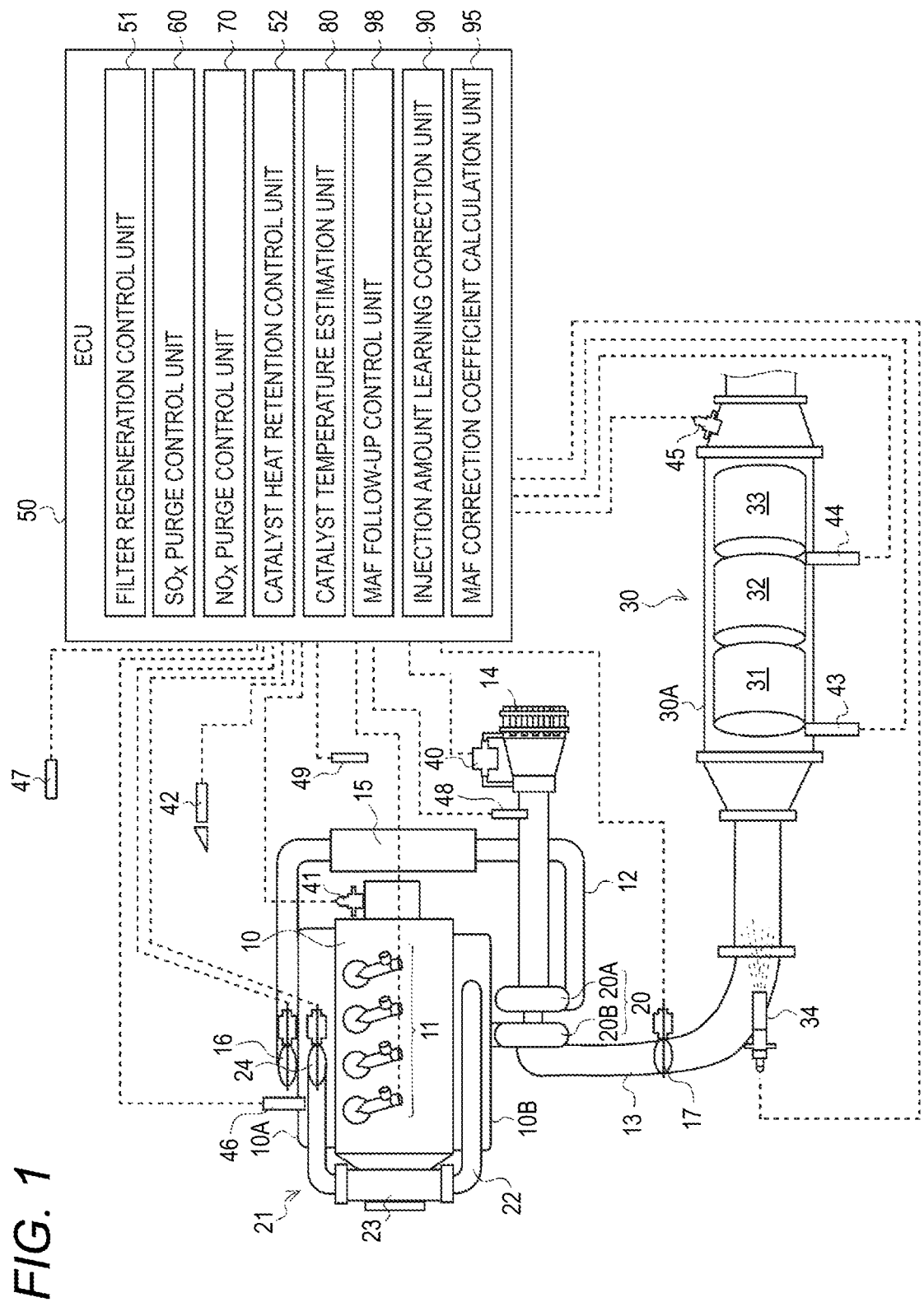
FIG. 1 is an overall configuration view depicting an exhaust gas purification system to which a control device in accordance with an illustrative embodiment is applied.

As shown in FIG. 1, each cylinder of a Diesel engine (hereinafter, simply referred to as 'engine') 10 is provided with an in-cylinder injector 11 configured to directly inject high-pressure fuel accumulated to a common rail (not shown) into each cylinder. A fuel injection amount and a fuel injection timing of each in-cylinder injector 11 are controlled in correspondence to instruction signals that are input from an electronic control unit (hereinafter, referred to as 'ECU') 50.

An intake manifold 10A of the engine 10 is connected with an intake passage 12 for introducing therein fresh air, and an exhaust gas manifold 10B is connected with an exhaust gas passage 13 for discharging an exhaust gas to an outside. The intake passage 12 is provided with an air cleaner 14, an intake air amount sensor (hereinafter, referred to as 'MAF sensor') 40, an intake air temperature sensor 48, a compressor 20A of a variable capacity-type supercharger 20, an intercooler 15, an intake air throttle valve 16 and the like, in corresponding order from an intake upstream side. The exhaust gas passage 13 is provided with a turbine 20B of the variable capacity-type supercharger 20, an exhaust gas brake valve 17 configuring a part of an exhaust gas brake device, an exhaust gas after-treatment device 30 and the like, in corresponding order from an exhaust gas upstream side. In the meantime, in FIG. 1, a reference numeral 41 indicates an engine revolution sensor, a reference numeral 42 indicates an accelerator opening degree sensor, a reference numeral 46 indicates a boost pressure sensor, a reference numeral 47 indicates an outside air temperature sensor, and a reference numeral 49 indicates a vehicle speed sensor.

An EGR (Exhaust Gas Recirculation) device 21 includes an EGR passage 22 configured to connect the exhaust gas manifold 10B and the intake manifold 10A each other, an EGR cooler 23 configured to cool an EGR gas, and an EGR valve 24 configured to regulate an EGR amount.

The exhaust gas after-treatment device 30 includes an oxidation catalyst 31, a NOx-occlusion-reduction-type catalyst 32 and a particulate filter (hereinafter, simply referred to as 'filter') 33, which are arranged in a case 30A in corresponding order from the exhaust gas upstream side. Also, the exhaust gas passage 13 positioned further upstream than the oxidation catalyst 31 is provided with an exhaust gas injector 34 configured to inject unburnt fuel (mainly, hydrocarbon (HC)) into the exhaust gas passage 13, in response to an instruction signal input from the ECU 50.

The oxidation catalyst 31 is formed by carrying an oxidation catalyst component on a surface of a ceramic carrier such as a honeycomb structure, for example. When the unburnt fuel is supplied by post injection of the exhaust gas injector 34 or the in-cylinder injector 11, the oxidation catalyst 31 oxidizes the same to increase an exhaust gas temperature.

The NOx-occlusion-reduction-type catalyst 32 is formed by carrying alkali metal or the like on a surface of a ceramic carrier such as a honeycomb structure, for example. The NOx-occlusion-reduction-type catalyst 32 occludes NOx in the exhaust gas when an exhaust gas air-fuel ratio is in a lean state, and reduces and purifies the occluded NOx with a reducing agent (HC or the like) included in the exhaust gas when the exhaust gas air-fuel ratio is in a rich state.

The filter 33 is formed by arranging a plurality of cells, which are divided by porous partition walls, along a flowing direction of the exhaust gas and alternately plugging upstream and downstream sides of the cells, for example. The filter 33 is configured to trap particulate matters (PM) in the exhaust gas in fine holes or surfaces of the partition walls, and when an estimated PM accumulation amount reaches a predetermined amount, so-called filter forced regeneration of combusting and removing the accumulated PM is executed. The filter forced regeneration is performed by supplying the unburnt fuel to the upstream oxidation catalyst 31 by the exhaust gas pipe injection or the post injection and increasing a temperature of the exhaust gas introduced to the filter 33 to a PM combustion temperature.

A first exhaust gas temperature sensor 43 is provided further upstream than the oxidation catalyst 31 and is configured to detect a temperature of the exhaust gas introduced into the oxidation catalyst 31. A second exhaust gas temperature sensor 44 is provided between the oxidation catalyst 31 and the NOx-occlusion-reduction-type catalyst 32 and is configured to detect a temperature of the exhaust gas introduced into the NOx-occlusion-reduction-type catalyst 32. A NOx/lambda sensor 45 is provided further downstream than the filter 33, and is configured to detect a NOx value and a lambda value (hereinafter, referred to as 'air excess ratio') of the exhaust gas having passed through the NOx-occlusion-reduction-type catalyst 32.

The ECU 50 is configured to perform a variety of controls of the engine 10 and the like and includes a CPU, a ROM, a RAM, an input port, an output port and the like, which are well known. In order to perform the diverse controls, the ECU 50 is input with sensor values of the sensors 40 to 48. Also, the ECU 50 has, as some functional elements, a filter regeneration control unit 51, a SOx purge control unit 60, a NOx purge control unit 70, a catalyst heat retention control unit 52, a catalyst temperature estimation unit 80, an MAF follow-up control unit 98, an injection amount learning correction unit 90 and an MAF correction coefficient calculation unit 95. The functional elements are included in the ECU 50, which is the integral hardware. However, some of the functional elements may be provided in separate hardware.

[Filter Regeneration Control]

The filter regeneration control unit 51 is configured to estimate a PM accumulation amount of the filter 33 from a traveling distance of a vehicle or a differential pressure before and after the filter detected by a differential pressure sensor (not shown), and sets a filter forced regeneration flag $F_{DPF}$ to an on-state (refer to time $t_1$ in FIG. 2) when the estimated PM accumulation amount exceeds a predetermined upper limit threshold value. When the filter forced regeneration flag $F_{DPF}$ becomes on, an instruction signal for executing exhaust gas pipe injection is transmitted to the exhaust gas injector 34 or an instruction signal for executing post injection is transmitted to each in-cylinder injector 11, so that the exhaust gas temperature is increased to a PM combustion temperature (for example, about 550° C.). The filter forced regeneration flag $F_{DPF}$ becomes off (refer to time $t_2$ in FIG. 2) when the estimated. PM accumulation amount is lowered to a predetermined lower limit threshold value (determination threshold value) indicative of combustion removal. The determination threshold value for selling the forced regeneration flag $F_{DPF}$ to an off-state may be set based on an upper limit elapse time from the filter forced regeneration start ($F_{DPF}=1$) or an upper limit cumulated injection amount.

In the illustrative embodiment, a fuel injection amount during the filter forced regeneration is controlled in a feedback manner based on any one of an oxidation catalyst temperature and a NOx catalyst temperature, which is selected by a reference temperature selection unit 89 (refer to FIG. 10), which will be described in detail later.

[SOx Purge Control]

The SOx purge control unit 60 is an example of the catalyst regeneration means of the present invention and is configured to execute control of enriching the exhaust gas, increasing the exhaust gas temperature to a sulfur separation temperature (for example, about 600° C.) and recovering the NOx-occlusion-reduction-type catalyst 32 from SOx poisoning (hereinafter, this control is referred to as 'SOx purge control').

Figure 2:
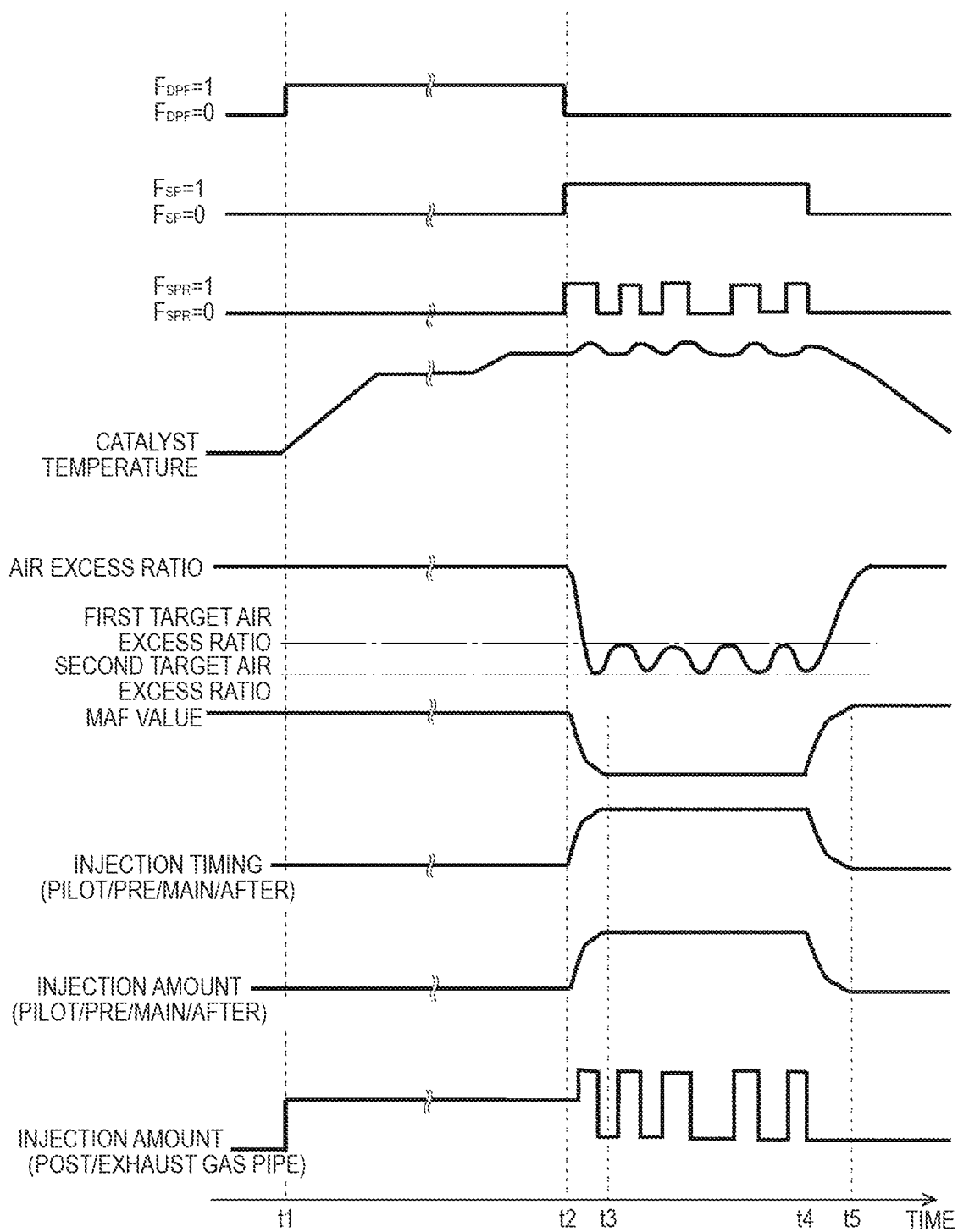
FIG. 2 is a timing chart illustrating SOx purge control in accordance with the illustrative embodiment.

FIG. 2 is a timing chart of the SOx purge control in accordance with the illustrative embodiment. As shown in FIG. 2, a SOx purge flag $F_{SP}$ for starting the SOx purge control becomes on at the same time when the filter forced regeneration flag $F_{DPF}$ becomes off (refer to time $t_2$ in FIG. 2). Thereby, the control can be effectively shifted to the SOx purge control from a state where the exhaust gas temperature has been increased by the forced regeneration of the filter 33, so that the fuel consumption can be effectively reduced.

In the illustrative embodiment, the enriching of the exhaust gas by the SOx purge control is implemented by concurrently using SOx purge lean control of lowering an air excess ratio from a value (for example, about 1.5) during normal operation to a first target air excess ratio (for example, about 1.3) closer to a lean side than a theoretical air-fuel ratio equivalent value (about 1.0) by air system control and SOx purge rich control of lowering the air excess ratio from the first target air excess ratio to a second target air excess ratio (for example, about 0.9) of a rich side by injection system control. Hereinafter, the SOx purge lean control and the SOx purge rich control are described in detail.

[Air System Control of SOx Purge Lean Control]

Figure 3:
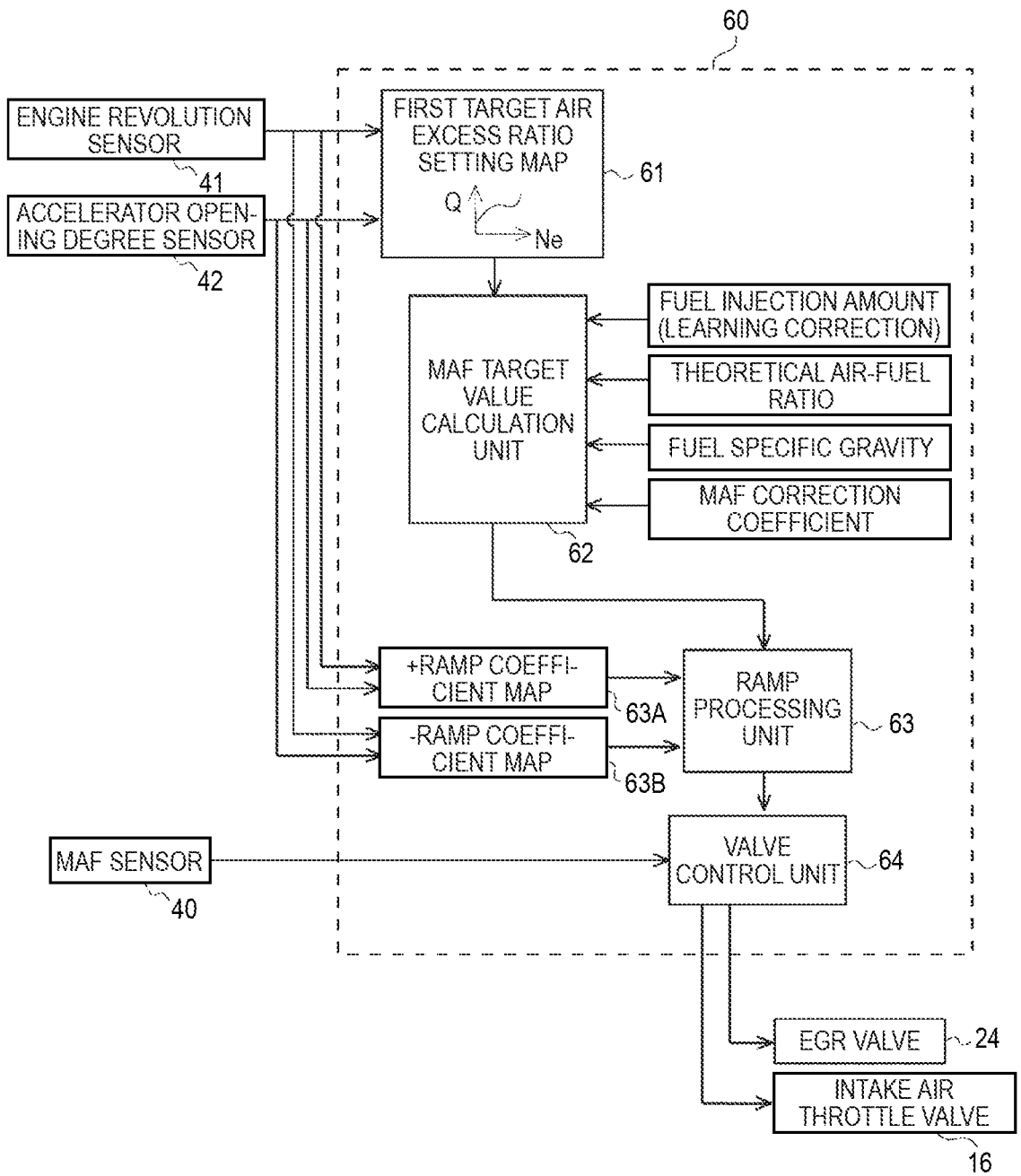
FIG. 3 is a block diagram depicting setting processing of an MAF (Mass Air Flow) target value during SOx purge lean control in accordance with the illustrative embodiment.

FIG. 3 is a block diagram depicting setting processing of an MAF target value $MAF_{SPL\_Trgt}$ during SOx purge lean control. A first target air excess ratio setting map 61 is a map that is referred to based on an engine revolution Ne and an accelerator opening degree Q (a fuel injection amount of the engine 10), and an air excess ratio target value $\lambda_{SPL\_Trgt}$ first target air excess ratio) during SOx purge lean control corresponding to the engine revolution Ne and the accelerator opening degree Q is set in advance by an experiment and the like.

First, the air excess ratio target value $\lambda_{SPL\_Trgt}$ during SOx purge lean control is read from the first target air excess ratio setting map 61, in response to the engine revolution Ne and the accelerator opening degree Q, which are input signals, and is then input to an MAF target value calculation unit 62.

Also, the MAF target value calculation unit 62 calculates an MAF target value $MAF_{SPL\_Trgt}$ during SOx purge lean control, based on an equation (1).

$$MAF_{SPL\_Trgt} = \lambda_{SPL\_Trgt} \times Q_{fnl\_coord} \times Ro_{Fuel} \times AFR_{sto} / Maf_{\_corr} \quad (1)$$

In the equation (1), $Q_{fnl\_corrd}$ indicates a learning-corrected fuel injection amount (the post injection is excluded) (which will be described later), $Ro_{Fuel}$ indicates a fuel specific gravity, $AFR_{sto}$ indicates a theoretical air-fuel ratio, and $Maf_{\_corr}$ indicates an MAF correction coefficient (which will be described later).

The MAF target value $MAF_{SPL\_Trgt}$ calculated by the MAF target value calculation unit 62 is input to a ramp processing unit 63 when the SOx purge flag $F_{SP}$ becomes on (refer to time $t_2$ in FIG. 2). The ramp processing unit 63 is configured to read a ramp coefficient from each of ramp coefficient maps 63A, 63B, in response to the engine revolution Ne and the accelerator opening degree Q, which are input signals, and to input an MAF target ramp value $MAF_{SPL\_Trgt\_Ramp}$ to which the ramp coefficient is added to a valve control unit 64.

The valve control unit 64 is configured to execute feedback control of narrowing the intake air throttle valve 16 towards a close side and widening the EGR valve 24 towards an open side so that an actual MAF value $MAF_{Act}$ input from the MAF sensor 40 becomes the MAF target ramp value $MAF_{SPL\_Trgt\_Ramp}$.

In this way, in the illustrative embodiment, the MAF target value $MAF_{SPL\_Trgt}$ is set based on the air excess ratio target value $\lambda_{SPL\_Trgt}$, which is read from the first target air excess ratio setting map 61, and the fuel injection amount of each in-cylinder injector 11, and the air system operation is controlled in the feedback manner based on the MAF target value $MAF_{SPL\_Trgt}$. Thereby, it is possible to effectively lower the exhaust gas to a desired air excess ratio necessary for the SOx purge lean control without providing a lambda sensor at the upstream side of the NOx-occlusion-reduction-type catalyst 32 or without using a sensor value of a lambda sensor even in a case where the lambda sensor is provided at the upstream side of the NOx-occlusion-reduction-type catalyst 32.

Also, the fuel injection amount $Q_{fnl\_corrd}$ after the learning correction is used as the fuel injection amount of each in-cylinder injector 11, so that it is possible to set the MAF target value $MAF_{SPL\_Trgt}$ in the feed-forward control manner. Therefore, it is possible to effectively exclude influences such as aging degradation, characteristic change and individual difference of each in-cylinder injector 11.

Also, the ramp coefficient, which is set in correspondence to the operating state of the engine 10, is added to the MAF target value $MAF_{SPL\_Trgt}$, so that it is possible to effectively prevent accident fire of the engine 10 due to a rapid change in the intake air amount, deterioration of drivability due to torque variation, and the like.

[Setting of Fuel Injection Amount in SOx Purge Rich Control]

Figure 4:
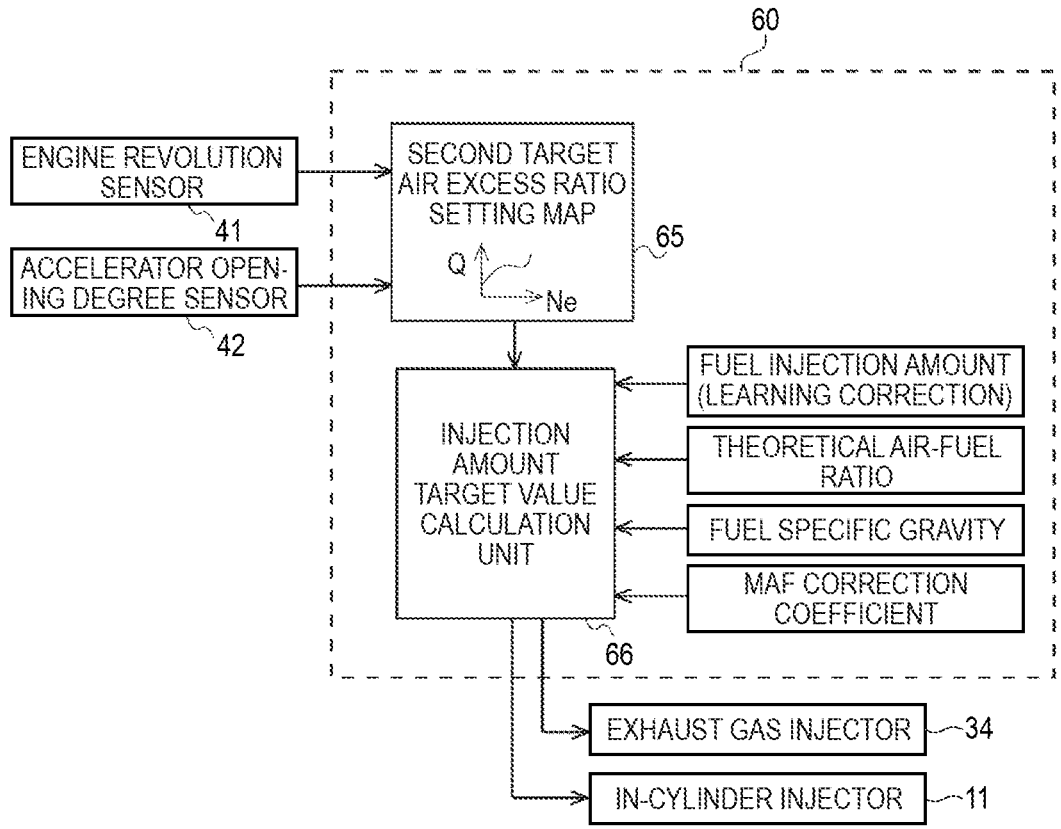
FIG. 4 is a block diagram depicting setting processing of a target injection amount during SOx purge rich control in accordance with the illustrative embodiment.

FIG. 4 is a block diagram depicting setting processing of a target injection amount $Q_{SPR\_Trgt}$ (injection amount per unit time) of the exhaust gas pipe injection or the post injection during the SOx purge rich control. A second target air excess ratio setting map 65 is a map that is referred to based on the engine revolution Ne and the accelerator opening degree Q, and an air excess ratio target value $\lambda_{SPR\_Trgt}$ (second target air excess ratio) during SOx purge rich control corresponding to the engine revolution Ne and the accelerator opening degree Q is set in advance by an experiment and the like.

First, the air excess ratio target value $\lambda_{SPR\_Trgt}$ during SOx purge rich control is read from the second target air excess ratio setting map 65, in response to the engine revolution Ne and the accelerator opening degree Q, which are input signals, and is then input to an injection amount target value calculation unit 66. Also, the injection amount target value calculation unit 66 calculates a target injection amount $Q_{SPR\_Trgt}$ during SOx purge rich control, based on an equation (2).

$$Q_{SPR\_Trgt} = MAF_{SPL\_Trgt} \times Maf_{\_corr} / (\lambda_{SPR\_Trgt} \times Ro_{Fuel} \times AFR_{sto}) - Q_{fnl\_corrd} \quad (2)$$

In the equation (2), $MAF_{SPL\_Trgt}$ is input from the MAF target value calculation unit 62, as an MAF target value during SOx purge lean. Also, $Q_{fnl\_corrd}$ indicates a learning-corrected fuel injection amount (the post injection is excluded) before an MAF follow-up control is applied (which will be described later), $Ro_{Fuel}$ indicates a fuel specific gravity, $AFR_{sto}$ indicates a theoretical air-fuel ratio, and $Maf_{\_corr}$ indicates an MAF correction coefficient (which will be described later).

The target injection amount $Q_{SPR\_Trgt}$ calculated by the injection amount target value calculation unit 66 is transmitted to the exhaust gas injector 34 or each in-cylinder injector 11, as an injection instruction signal, when a SOx purge flag $F_{SPR}$ (which will be described later) becomes on.

In this way, in the illustrative embodiment, the target injection amount $Q_{SPR\_Trgt}$ is set based on the air excess ratio target value $\lambda_{SPR\_Trgt}$, which is read from the second target air excess ratio setting map 65, and the fuel injection amount of each in-cylinder injector 11. Thereby, it is possible to effectively lower the exhaust gas to a desired air excess ratio necessary for the SOx purge rich control without providing a lambda sensor at the upstream side of the NOx-occlusion-reduction-type catalyst 32 or without using a sensor value of a lambda sensor even in a case where the lambda sensor is provided at the upstream side of the NOx-occlusion-reduction-type catalyst 32.

Also, the fuel injection amount $Q_{fnl\_corrd}$ after the teaming correction is used as the fuel injection amount of each in-cylinder injector 11, so that it is possible to set the target injection amount $Q_{SPR\_Trgt}$ in the feed-forward control manner. Therefore, it is possible to effectively exclude influences such as aging degradation and characteristic change of each in-cylinder injector 11.

[Catalyst Temperature Regulation Control in SOx Purge Control]

The exhaust gas temperature (hereinafter, also referred to as 'catalyst temperature') introduced into the NOx-occlusion-reduction-type catalyst 32 during the SOx purge control is controlled by alternately switching on/off states (rich/lean) of a SOx purge rich flag $F_{SPR}$ for executing the exhaust gas pipe injection or the post injection, as shown at time $t_2$ to $t_4$ in FIG. 2. When the SOx purge rich flag $F_{SPR}$ becomes on ($F_{SPR}=1$), the catalyst temperature is increased by the exhaust gas pipe injection or the post injection (hereinafter, the corresponding time period is referred to as 'injection time period $T_{F\_INJ}$'). On the other hand, when the SOx purge rich flag $F_{SPR}$ becomes off, the catalyst temperature is decreased by stop of the exhaust gas pipe injection or the post injection (hereinafter, the corresponding time period is referred to as 'interval $T_{F\_INT}$').

In the illustrative embodiment, the injection time period $T_{F\_INJ}$ is set by reading a value corresponding to the engine revolution Ne and the accelerator opening degree Q from an injection time period setting map (not shown) prepared in advance by an experiment and the like. In the injection time period setting map, an injection time period, which is required to securely lower the air excess ratio of the exhaust gas obtained in advance by an experiment and the like to the second target air excess ratio, is set in correspondence to the operating state of the engine 10.

The interval $T_{F\_INT}$ is set by feedback control when the SOx purge rich flag $F_{SPR}$ is switched from the on-state, at which the catalyst temperature is highest, to the off-state. Specifically, the interval is processed by PID control consisting of proportional control of changing an input signal in proportion to a deviation ΔT between a catalyst target temperature when the SOx purge rich flag $F_{SPR}$ becomes off and an estimated catalyst temperature, integral control of changing an input signal in proportion to a time integral value of the deviation ΔT and derivative control of changing an input signal in proportion to a time derivative value of the deviation ΔT. The catalyst target temperature is set to a temperature at which SOx can be separated from the NOx-occlusion-reduction-type catalyst 32, and the estimated catalyst temperature is set by any one of an oxidation catalyst temperature and a NOx catalyst temperature, which is appropriately selected by a reference temperature selection unit 89 (refer to FIG. 10), which will be described in detail later.

Figure 5:
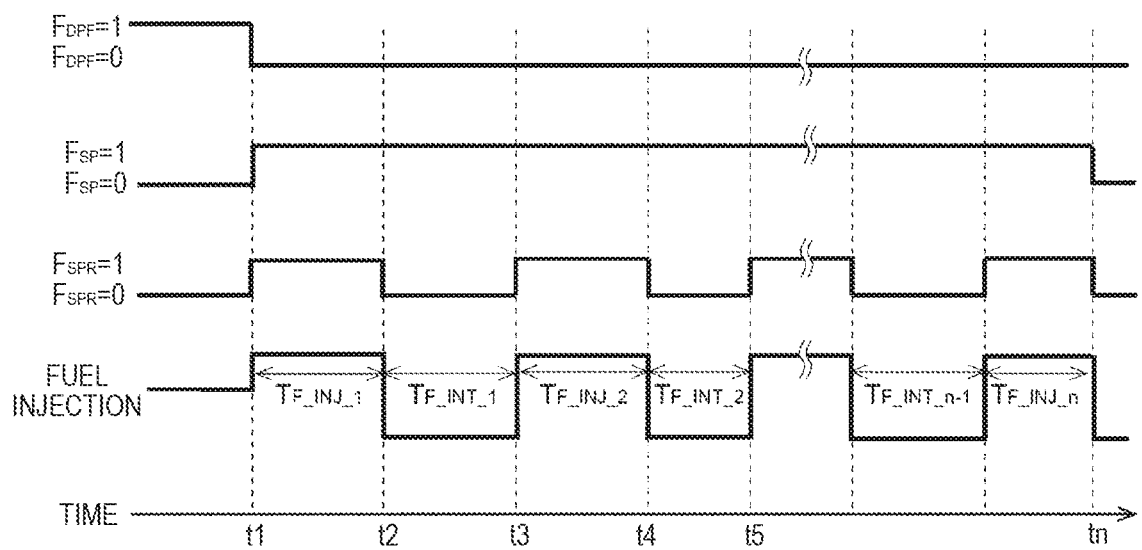
FIG. 5 is a timing chart illustrating catalyst temperature regulation control of the SOx purge control in accordance with the illustrative embodiment.

As shown at time $t_1$ in FIG. 5, when the SOx purge flag $F_{SP}$ becomes on as the filter forced regeneration is ended ($F_{DPF}$=0), the SOx purge rich flag $F_{SPR}$ becomes on, too, so that the interval $T_{F\_INT}$ calculated in the feedback manner during previous SOx purge control is once reset. That is, at first-time control immediately after the filter forced regeneration, the exhaust gas pipe injection or the post injection is executed (refer to time $t_1$ to $t_2$ in FIG. 5), in correspondence to the injection time period $T_{F\_INJ\_1}$ set in the injection time period setting map. In this way, since the SOx purge control is started from the SOx purge rich control without performing the SOx purge lean control, the control is rapidly shifted to the SOx purge control without lowering the exhaust gas temperature, which has been increased by the filter forced regeneration, so that it is possible to reduce the fuel consumption.

Then, when the SOx purge rich flag $F_{SPR}$ becomes off as the injection time period $T_{F\_INJ\_1}$ has elapsed, the SOx purge rich flag $F_{SPR}$ is kept at the off-state until an interval $T_{F\_INT\_1}$ set by the PM control elapses (refer to time $t_2$ to $t_3$ in FIG. 5). Also, when the SOx purge rich flag $F_{SPR}$ becomes on as the interval $T_{F\_INT\_1}$ has elapsed, the exhaust gas pipe injection or the post injection corresponding to an injection time period $T_{F\_INJ\_2}$ is again executed (refer to time $t_3$ to $T_4$ in FIG. 5). Thereafter, the on/off switching of the SOx purge rich flag $F_{SPR}$ is repeatedly executed until the SOx purge flag $F_{SP}$ becomes off (refer to time $t_n$ FIG. 5) by ending determination of the SOx purge control (which \yin be described later).

In this way, in the illustrative embodiment, the injection time period $T_{F\_INJ}$ in which the catalyst temperature is increased and the air excess ratio is lowered to the second target air excess ratio is set from the map that is referred to based on the operating state of the engine 10, and the interval $T_{F\_INT}$ in which the catalyst temperature is lowered is processed by the PID control. Thereby, while effectively maintaining the catalyst temperature during the SOx purge control within a desired temperature range necessary for the purge, it is possible to securely lower the air excess ratio to the target excess ratio.

[Ending Determination of SOx Purge Control]

In a case where any one of conditions that (1) the injection amounts of the exhaust gas pipe injection or the post injection are cumulated from the on-state of the SOx purge flag $F_{SP}$ and the cumulated injection amount reaches a predetermined upper limit threshold value amount, (2) the elapse time measured from the start of the SOx purge control reaches predetermined upper limit threshold value time and (3) a SOx occlusion amount of the NOx-occlusion-reduction-type catalyst 32, which is calculated based on a predetermined model equation including, as input signals, an operating state of the engine 10, a sensor value of the NOx/lambda sensor 45 and the like, is lowered to a predetermined threshold value indicative of SOx removal success is satisfied, the SOx purge flag $F_{SP}$ is set to an off-state and the SOx purge control is over (refer to time $t_4$ in FIG. 2 and time $t_n$ in FIG. 5).

In this way, in the illustrative embodiment, the upper limits of the cumulated injection amount and the elapse time are provided with respect to the ending conditions of the SOx purge control, so that it is possible to effectively prevent the fuel from being excessively consumed in a case where the SOx purge is not progressed due to the decrease in the exhaust gas temperature and the like.

[NOx Purge Control]

The NOx purge control unit 70 is an example of the catalyst regeneration means of the present invention and is configured to execute control of enriching the exhaust gas and detoxifying and releasing NOx, which is occluded in the NOx-occlusion-reduction-type catalyst 32, by reduction and purification, thereby recovering a NOx occlusion capacity of the NOx-occlusion-reduction-type catalyst 32 (hereinafter, the control is referred to as 'NOx purge control').

A NOx purge flag $F_{NP}$ for starting the NOx purge control becomes on (refer to time $t_1$ in FIG. 6) when a NOx emission amount per unit time is estimated from an operating state of the engine 10 and an estimated cumulative value ΣNOx obtained by cumulatively calculating the emission amounts exceeds a predetermined threshold value. Alternatively, in a case where a NOx conversion efficiency by the NOx-occlusion-reduction-type catalyst 32 is calculated from a NOx emission amount of a catalyst upstream side, which is estimated from the operating state of the engine 10, and a NOx amount of a catalyst downstream side, which is detected by the NOx/lambda sensor 45, and the NOx conversion efficiency becomes below a predetermined determination threshold value, the NOx purge flag $F_{NP}$ becomes on.

In the illustrative embodiment, the enriching of the exhaust gas by the NOx purge control is implemented by concurrently using NOx purge lean control of lowering an air excess ratio from a value (for example, about 1.5) during normal operation to a third target air excess ratio (for example, about 1.3) closer to a lean side than a theoretical air-fuel ratio equivalent value (about 1.0) by air system control and NOx purge rich control of lowering the air excess ratio from the third target air excess ratio to a fourth target air excess ratio (for example, about 0.9) of a rich side by injection system control. Hereinafter, the NOx purge lean control and the NOx purge rich control are described in detail.

[Setting of MAF Target Value in NOx Purge Lean Control]

Figure 7:
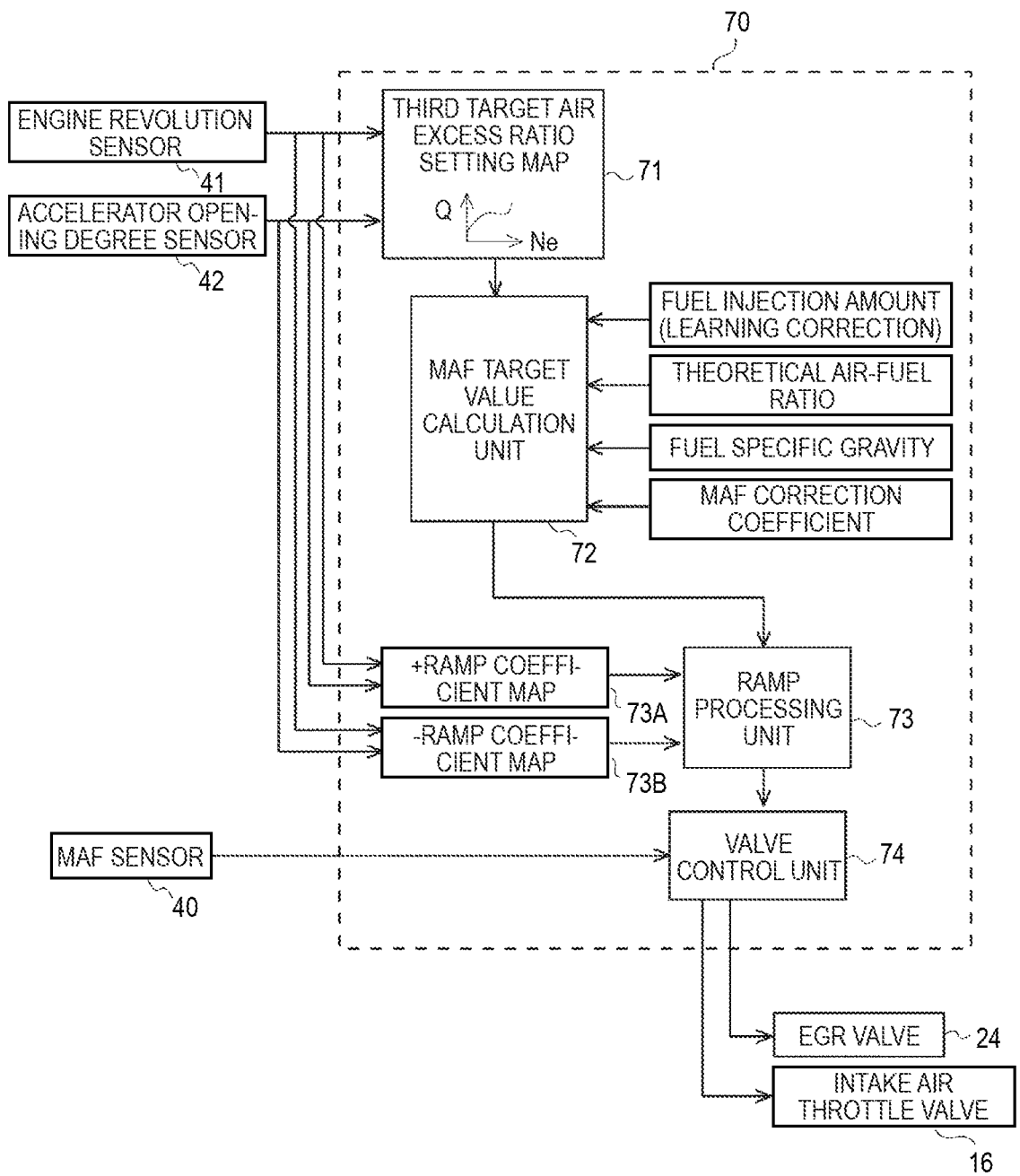
FIG. 7 is a block diagram depicting setting processing of an MAF target value during NOx purge lean control in accordance with the illustrative embodiment.

FIG. 7 is a block diagram depicting setting processing of an MAF target value $MAF_{NPL\_Trgt}$ during NOx purge lean control. A third target air excess ratio setting map 71 is a map that is referred to based on an engine revolution Ne and an accelerator opening degree Q, and an air excess ratio target value $\lambda_{NPL\_Trgt}$ (third target air excess ratio) during NOx purge lean control corresponding to the engine revolution Ne and the accelerator opening degree Q is set in advance by an experiment and the like.

First, the air excess ratio target value $\lambda_{NPL\_Trgt}$ during NOx purge lean control is read from the third target air excess ratio setting map 71, in response to the engine revolution Ne and the accelerator opening degree Q, which are input signals, and is then input to an MAF target value calculation unit 72. Also, the MAF target value calculation unit 72 calculates an MAF target value $MAF_{NPL\_Trgt}$ during NOx purge lean control, based on an equation (3).

$$MAF_{NPL\_Trgt} = \lambda_{NPL\_Trgt} \times Q_{fnl\_corrd} \times Ro_{Fuel} \times AFR_{sto}/Maf_{\_corr} \quad (3)$$

In the equation 0 indicates a learning-corrected fuel injection amount (the post injection is excluded) (which will be described later), $Ro_{Fuel}$ indicates a fuel specific gravity $AFR_{sto}$ indicates a theoretical air-fuel ratio, and $Maf_{\_corr}$ indicates an MAF correction coefficient (which will be described later).

Figure 6:
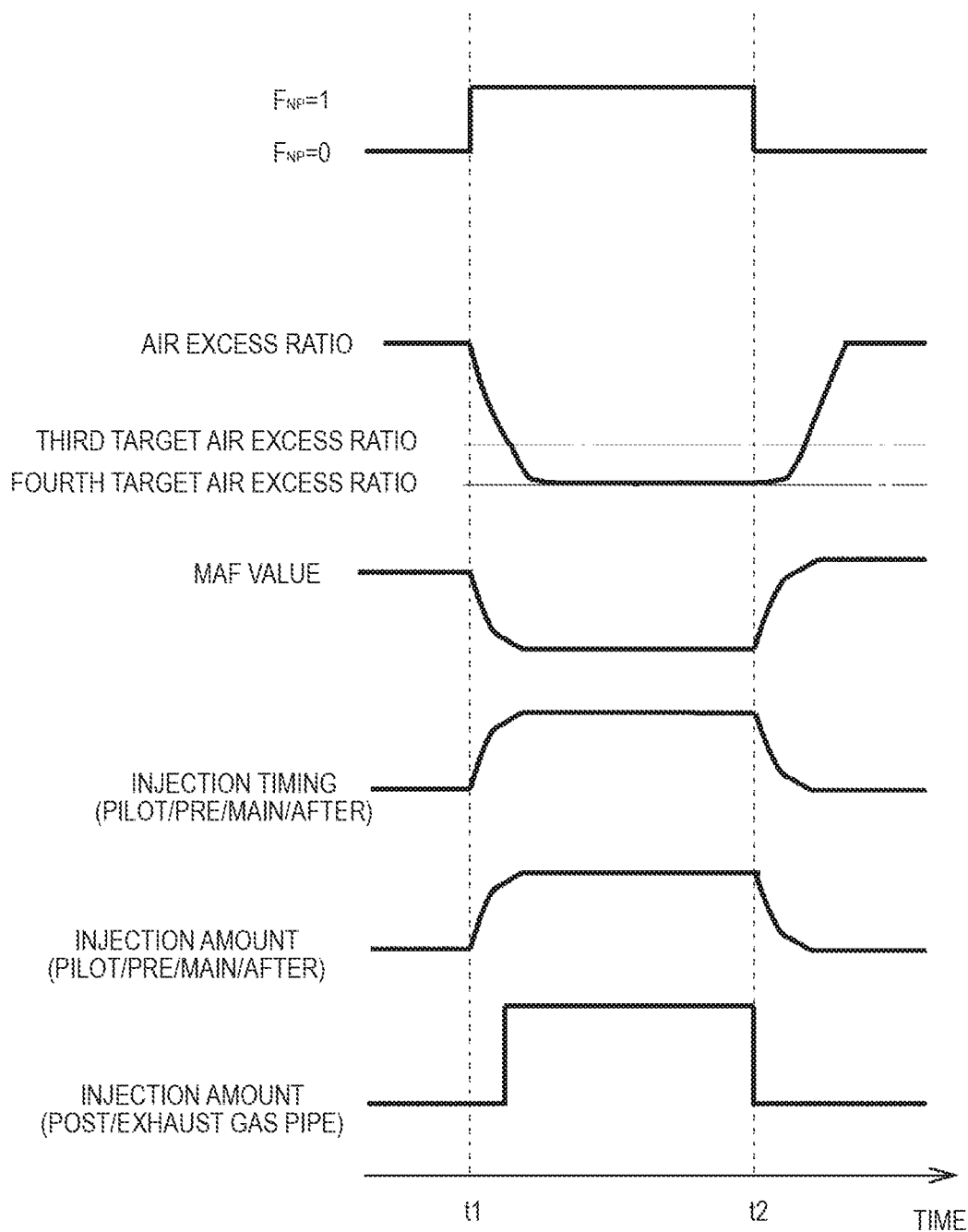
FIG. 6 is a timing chart illustrating NOx purge control in accordance with the illustrative embodiment.

The MAF target value $MAF_{NPL\_Trgt}$ calculated by the MAF target value calculation unit 72 is input to a ramp processing unit 73 when the NOx purge flag $F_{SP}$ becomes on (refer to time $t_1$ in FIG. 6). The ramp processing unit 73 is configured to read a ramp coefficient from each of ramp coefficient maps 73A, 73B, in response to the engine revolution Ne and the accelerator opening degree Q, which are input signals, and to input an MAF target ramp value $MAF_{NPL\_Trgt\_Ramp}$ to which the ramp coefficient is added to a valve control unit 74.

The valve control unit 74 is configured to execute feed-back control of narrowing the intake air throttle valve 16 towards a close side and widening the EGR valve 24 towards an open side so that an actual MAF value $MAF_{Act}$ input from the MAF sensor 40 becomes the MAF target ramp value $MAF_{NPL\_Trgt\_Ramp}$.

In this way, in the embodiment, the MAF target value $MAF_{NPL\_Trgt}$ is set based on the air excess ratio target value $\lambda_{NPL\_Trgt}$, which is read from the first target air excess ratio setting map 71, and the fuel injection amount of each in-cylinder injector 11, and the air system operation is controlled in the feedback manner based on the MAF target value $MAF_{NPL\_Trgt}$. Thereby, it is possible to effectively lower the exhaust gas to a desired air excess ratio necessary for the NOx purge lean control without providing a lambda sensor at an upstream side of the NOx-occlusion-reduction-type catalyst 32 or without using a sensor value of a lambda sensor even in a case where the lambda sensor is provided at the upstream side of the NOx-occlusion-reduction-type catalyst 32.

Also, the fuel injection amount $Q_{fnl\_corrd}$ after the learning correction is used as the fuel injection amount of each in-cylinder injector 11, so that it is possible to set the MAF target value $MAF_{NPL\_Trgt}$ in the feed-forward control manner. Therefore, it is possible to effectively exclude influences such as aging degradation and characteristic change of each in-cylinder injector 11.

Also, the ramp coefficient, which is set in correspondence to the operating state of the engine 10, is added to the MAF target value $MAF_{NPL\_Trgt}$, so that it is possible to effectively prevent accident fire of the engine 10 due to a rapid change in the intake air amount, deterioration of drivability due to torque variation, and the like.

[Setting of Fuel Injection Amount in NOx Purge Rich Control]

Figure 8:
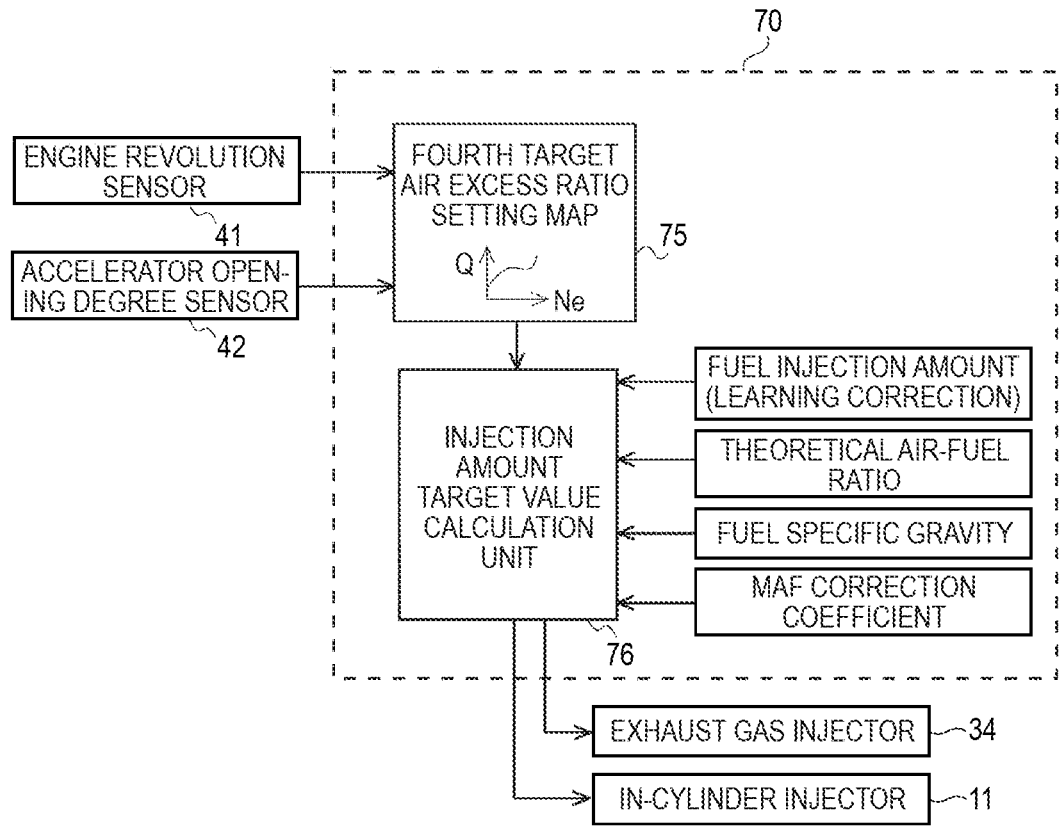
FIG. 8 is a block diagram depicting setting processing of a target injection amount during NOx purge rich control in accordance with the illustrative embodiment.

FIG. 8 is a block diagram depicting setting processing of a target injection amount $Q_{NPR\_Trgt}$ (injection amount per unit time) of the exhaust gas pipe injection or the post injection during NOx purge rich control. A fourth target air excess ratio setting map 75 is a map that is referred to based on the engine revolution Ne and the accelerator opening degree Q, and an air excess ratio target value $\lambda_{NPR\_Trgt}$ (fourth target air excess ratio) during NOx purge rich control corresponding to the engine revolution Ne and the accelerator opening degree Q is set in advance by an experiment and the like.

First, the air excess ratio target value $\lambda_{NPR\_Trgt}$ during NOx purge rich control is read from the fourth target air excess ratio setting map 75, in response to the engine revolution Ne and the accelerator opening degree Q, which are input signals, and is then input to an injection amount target value calculation unit 76. Also, the injection amount target value calculation unit 76 calculates a target injection amount $Q_{NPR\_Trgt}$ during NOx purge rich control, based on an equation (4).

$$Q_{NPR\_Trgt} = MAF_{NPL\_Trgt} \times Maf_{\_corr}/(\lambda_{NPR\_Trgt} \times Ro_{Fuel} \times AFR_{sto}) - Q_{fnl\_corrd} \quad (4)$$

In the equation (4), $MAF_{NPL\_Trgt}$ is input from the MAF target value calculation unit 72, as a NOx purge lean MAF target value. Also, $Q_{fnl\_corrd}$ indicates a learning-corrected fuel injection amount (the post injection is excluded) before an MAF follow-up control is applied, $Ro_{Fuel}$ indicates a fuel specific gravity, $AFR_{sto}$ indicates a theoretical air-fuel ratio, and $Maf_{\_corr}$ indicates an MAF correction coefficient (which will be described later).

The target injection amount $Q_{NPR\_Trgt}$ calculated by the injection amount target value calculation unit 76 is transmitted to the exhaust gas injector 34 or each in-cylinder injector 11, as an injection instruction signal, when the NOx purge flag $F_{SP}$ becomes on (refer to time $t_1$ in FIG. 6). The injection instruction signal is continuously transmitted until the NOx purge flag $F_{NP}$ becomes off (refer to time $t_2$ in FIG. 6) by ending determination of the NOx purge control (which will be described later).

In this way, in the illustrative embodiment, the target injection amount $Q_{NPR\_Trgt}$ is set based on the air excess ratio target value $\lambda_{NPR\_Trgt}$, which is read from the fourth target air excess ratio setting map 75, and the fuel injection amount of each in-cylinder injector 11. Thereby, it is possible to effectively lower the exhaust gas to a desired air excess ratio necessary for the NOx purge rich control without providing a lambda sensor at the upstream side of the NOx-occlusion-reduction-type catalyst 32 or without using a sensor value of a lambda sensor even in a case where the lambda sensor is provided at the upstream side of the NOx-occlusion-reduction-type catalyst 32.

Also, the fuel injection amount $Q_{fnl\_corrd}$ after the teaming correction is used as the fuel injection amount of each in-cylinder injector 11, so that it is possible to set the target injection amount $Q_{NPR\_Trgt}$ in the feed-forward control manner. Therefore, it is possible to effectively exclude influences such as aging degradation and characteristic change of each in-cylinder injector 11.

[Ending Determination of NOx Purge Control]

In a case where any one of conditions that (1) the injection amounts of the exhaust gas pipe injection or the post injection are cumulated from the on-state of the NOx purge flag $F_{NP}$ and the cumulated injection amount reaches a predetermined upper limit threshold value amount, (2) the elapse time measured from the start of the NOx purge control reaches predetermined upper limit threshold value time and (3) a NOx occlusion amount of the NOx-occlusion-reduction-type catalyst 32, which is calculated based on a predetermined model equation including, as input signals, an operating state of the engine 10, a sensor value of the NOx/lambda sensor 45 and the like, is lowered to a predetermined threshold value indicative of NOx removal success is satisfied, the NOx purge flag $F_{NP}$ is set to an off-state and the NOx purge control is over (refer to time $t_2$ in FIG. 6).

In this way, in the illustrative embodiment, the upper limits of the cumulated injection amount and the elapse time are provided with respect to the ending conditions of the NOx purge control, so that it is possible to securely prevent the fuel from being excessively consumed in a case where the NOx purge fails due to the decrease in the exhaust gas temperature and the like.

[Catalyst Heat Retention Control (MAF Restriction Control)]

Figure 9:
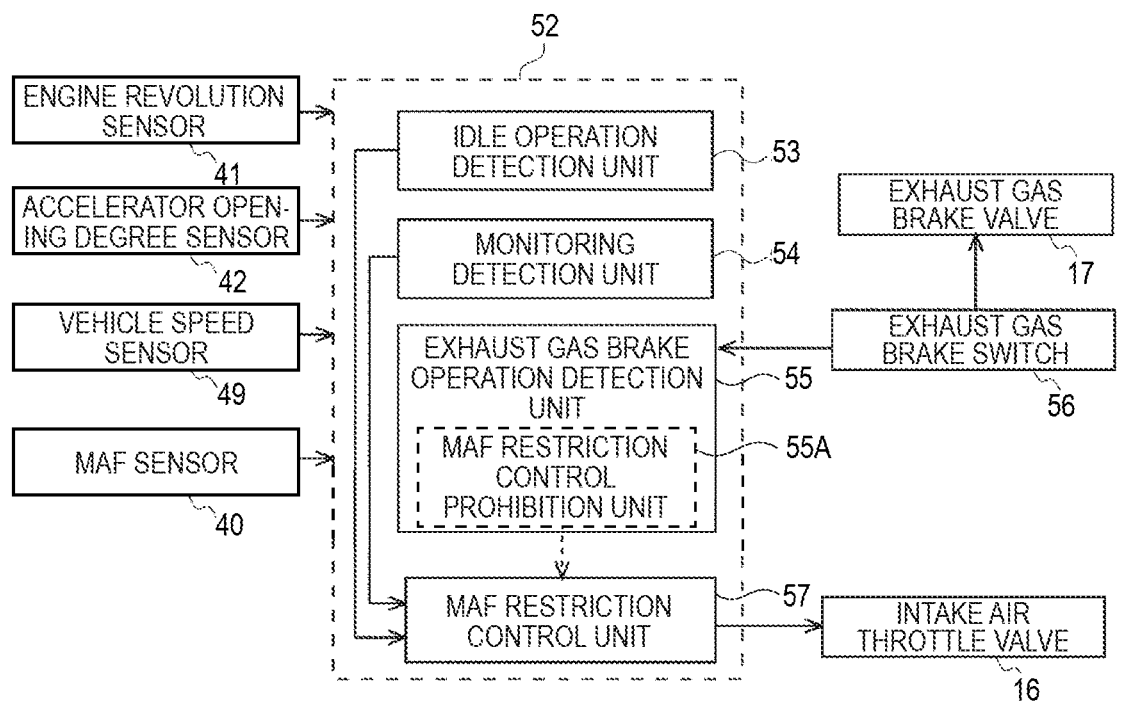
FIG. 9 is a block diagram depicting catalyst heat retention control processing in accordance with the illustrative embodiment.

FIG. 9 is a block diagram depicting catalyst heat retention control processing that is executed by the catalyst heat retention control unit 52.

An idle operation detection unit 53 is configured to detect whether the engine lip is in an idle operating state, based on sensor values input from the diverse sensors 41, 42, 49.

A motoring detection unit 54 is configured to detect whether the engine 10 is in monitoring state where the engine is operated at a predetermined revolution or higher and the fuel injection of the in-cylinder injector 11 is stopped, based on sensor values input from the diverse sensors 41, 42, 49.

An exhaust gas brake operation detection unit 55 is configured to detect whether an exhaust gas brake device, which is configured to increase an exhaust gas pressure and to lower a rotating speed of the engine 10 by closing the exhaust gas brake valve 17, is operated. It may be possible to detect whether the exhaust gas brake device is operated, based on an on/off operation of an exhaust gas brake switch 56 provided in a driver's cabin of a vehicle (not shown).

An MAF restriction control unit 57 executes catalyst heat retention control (hereinafter, referred to as 'MAF restriction control') of suppressing the low-temperature exhaust gas from being introduced into each of the catalysts 31, 32 by narrowing an opening degree of the intake air throttle valve 16 (or at least one of the intake air throttle valve and the exhaust gas throttle valve) towards the close side to reduce an intake air amount, in a case where any of following conditions is satisfied.

(1) The idle operating state of the engine 10 is detected by the idle operation detection unit 53.

(2) The monitoring state of the engine 10 is detected by the motoring detection unit 54.

In the meantime, the valve opening degree during the MAF restriction control is controlled in a feedback manner, based on a deviation between a predetermined target MAF value smaller than during normal lean operation and a sensor value (actual MAF value) of the MAF sensor 40. The predetermined target MAF value is set with being multiplied by a correction coefficient corresponding to an intake air temperature and an atmospheric pressure in a base map (not shown), which is referred to based on the operating state of the engine 10, for example.

An MAF restriction control prohibition unit 55A prohibits implementation of the MAF restriction control so as to secure a braking force in a case where the exhaust gas brake operation detection unit 55 detects an operation of the exhaust gas brake device even though the monitoring state is detected by the motoring detection unit 54.

In this way, in the illustrative embodiment, in a situation where the catalyst temperature may be lowered to a temperature below an activation temperature due to decrease in the exhaust gas temperature, such as during the idle operation and during the monitoring, the catalyst heat retention control of restricting the intake air amount is implemented, so that it is possible to effectively maintain the respective catalysts 31, 32 at an activated state. Also, even at the monitoring state, when the exhaust gas brake device is operated, the implementation of the catalyst heat retention control is prohibited, so that it is possible to effectively secure the braking force.

[Catalyst Temperature Estimation]

Figure 10:
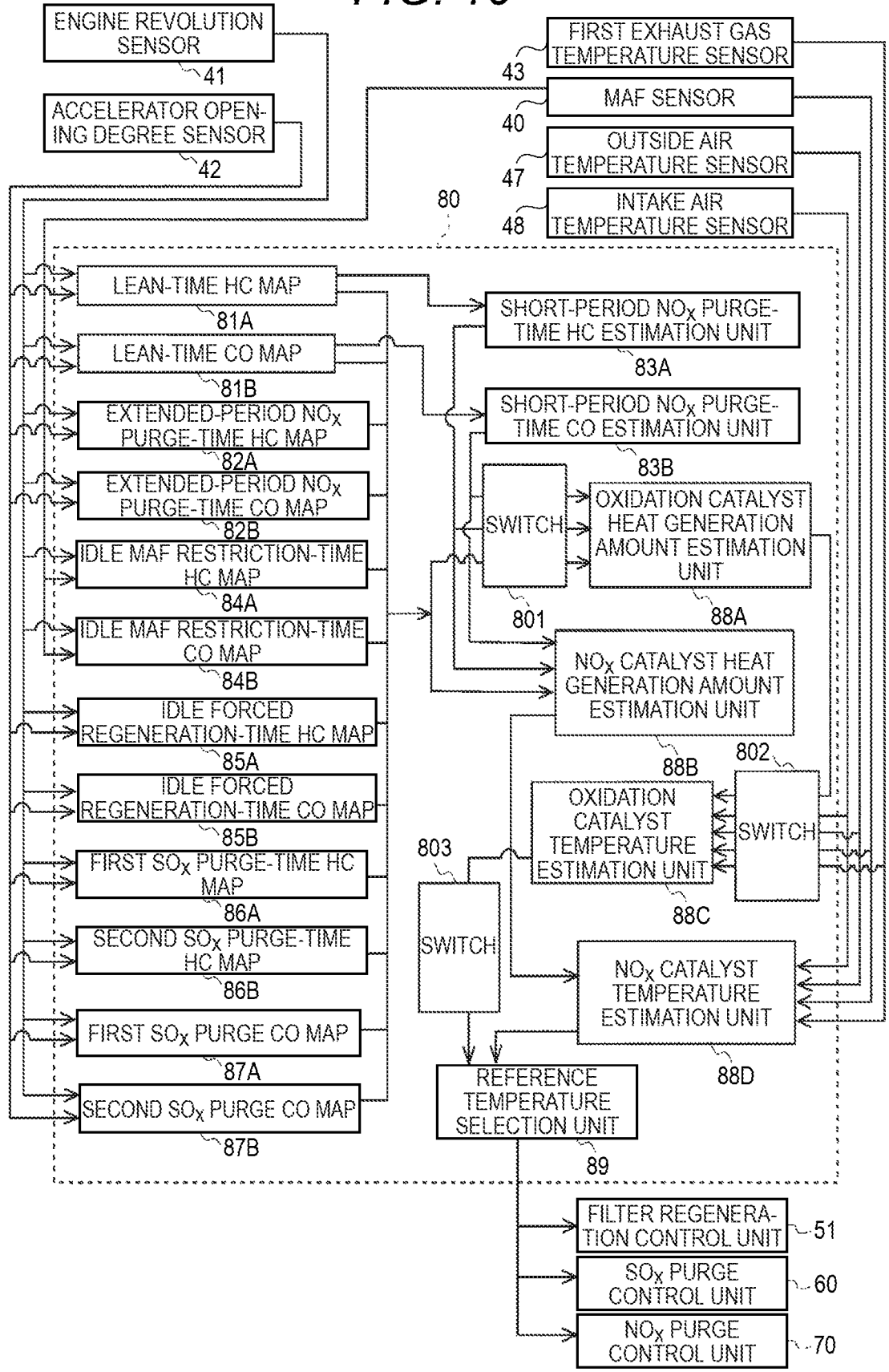
FIG. 10 is a block diagram depicting catalyst temperature estimation processing in accordance with the illustrative embodiment.

FIG. 10 is a block diagram depicting estimation processing of the oxidation catalyst temperature and the NOx catalyst temperature, which is performed by the catalyst temperature estimation unit 80.

A lean-time HC map 81A (the second emission amount storing means) is a map that is referred to based on the operating state of the engine 10, and a HC amount (hereinafter, referred to as 'lean-time HC emission amount') emitted from the engine 10 during the lean operation is set therein in advance by an experiment and the like. In a case where the idle operation is not detected by the idle operation detection unit 53 (refer to FIG. 9) and the filter forced regeneration flag $F_{DPF}$, the SOx purge flag $F_{SP}$ and the NOx purge flag $F_{NP}$ are all off ($F_{DPF}=0$, $F_{SP}=0$, $F_{NP}=0$), the lean-time HC emission amount read from the lean-time HC map 81A based on the engine revolution Ne and the accelerator opening degree Q is transmitted to each of heat generation amount estimation units 88A, 88B.

A lean-time CO map 81B (the second emission amount storing means) is a map that is referred to based on the operating state of the engine 10, and a CO amount (hereinafter, referred to as 'lean-time CO emission amount') emitted from the engine 10 during the lean operation is set therein in advance by an experiment and the like. In a case where the idle operation is not detected by the idle operation detection unit 53 (refer to FIG. 9) and the filter forced regeneration flag $F_{DPF}$, the SOx purge flag $F_{SP}$ and the NOx purge flag $F_{NP}$ are all off ($F_{DPF}=0$, $F_{SP}=0$, $F_{NP}=0$), the lean-time CO emission amount read from the lean-time CO map 81B based on the engine revolution Ne and the accelerator opening degree Q is transmitted to the respective heat generation amount estimation units 88A, 88B.

An extended-period NOx purge-time HC map 82A (the first emission amount storing means) is a map that is referred to the operating state of the engine 10, and a FTC amount (hereinafter, referred to as 'extended-period NOx purge-time HC emission amount'), which is emitted from the engine 10 when the NOx purge is implemented for an extended time period in which a target execution time period of the NOx purge control is predetermined time period or longer, is set therein in advance by an experiment and the like. In a case where the NOx purge flag $F_{NP}$ is on ($F_{NP}=1$) and the target execution time period of the NOx purge control is a predetermined time period or longer, the extended-period NOx purge-time HC emission amount read from the extended-period NOx purge-time HC map 82A based on the engine revolution Ne and the accelerator opening degree Q is multiplied by a predetermined correction coefficient corresponding to the operating state of the engine 10, which is then transmitted to the respective heat generation amount estimation units 88A, 88B.

An extended-period NOx purge-time CO map 82B (the first emission amount storing means) is a map that is referred to based on the operating state of the engine 10, and a CO amount (hereinafter, referred to as 'extended-period NOx purge-time CO emission amount'), which is emitted from the engine 10 when the NOx purge is implemented for an extended time period in which a target execution time period of the NOx purge control is a predetermined time period or longer, is set therein in advance by an experiment and the like. In a case where the NOx purge flag $F_{NP}$ is on ($F_{NP}$=1) and the target execution time period of the NOx purge control is a predetermined time period or longer, the extended-period NOx purge-time CO emission amount read from the extended-period NOx purge-time CO map 82B based on the engine revolution Ne and the accelerator opening degree Q is multiplied by a predetermined correction coefficient corresponding to the operating state of the engine 10, which is then transmitted to the respective heat generation amount estimation units 88A, 88B.

When implementing short-time NOx purge control in which the target execution time period of the NOx purge control is shorter than a predetermined time period, a short-period NOx purge-time HC estimation unit 83A estimates and calculates a HC amount (hereinafter, referred to as 'short-period NOx purge-time HC emission amount'), which is emitted from the engine 10 during the short-time NOx purge control, by multiplying a HC emission amount read from the lean-time HC map 81A (or the extended-period NOx purge-time HC map 82A) based on the engine revolution Ne and the accelerator opening degree Q by a predetermined correction coefficient. The calculated short-period NOx purge-time HC emission amount is transmitted to the respective heat generation amount estimation units 88A, 88B in a case where the NOx purge flag $F_{NP}$ is on ($F_{NP}$=1) and the target execution time period of the NOx purge control is shorter than a predetermined time period.

When implementing the short-time NOx purge control in which the target execution time period of the NOx purge control is shorter than a predetermined time period, a short-period NOx purge-time CO estimation unit 83B estimates and calculates a CO amount (hereinafter, referred to as 'short-period NOx purge-time CO emission amount'), which is emitted from the engine 10 during the short-time NOx purge control, by multiplying a CO emission amount read from the lean-time CO map 81B (or the extended-period NOx purge-time CO map 82B) based on the engine revolution Ne and the accelerator opening degree Q by a predetermined correction coefficient. The calculated short-period NOx purge-time CO emission amount is transmitted to the respective heat generation amount estimation units 88A, 88B in a case where the NOx purge flag $F_{NP}$ is on ($F_{NP}$=1) and the target execution time period of the NOx purge control is shorter than a predetermined time period.

An idle MAF restriction-time HC map 84A is a map that is referred to based on the operating state of the engine 10, and a HC amount (hereinafter, referred to as 'idle MAF restriction-time HC emission amount') emitted from the engine 10 during the catalyst heat retention control (the MAF restriction control) is set therein in advance by an experiment and the like. In a case where the catalyst heat retention control is executed at the idle operating state and the forced regeneration flag $F_{DPF}$, the SOx purge flag $F_{SP}$ and the NOx purge flag $F_{NP}$ are all off ($F_{DPF}$=0. $F_{SP}$=0, $F_{NP}$=0), the idle MAF restriction-time HC emission amount read from the idle MAF restriction-time HC map 84A based on the engine revolution Ne and the MAF sensor value is transmitted to the respective heat generation amount estimation units 88A, 88B.

An idle MAF restriction-time HC map 84B is a map that is referred to based on the operating state of the engine 10, and a CO amount (hereinafter, referred to as 'idle MAF restriction-time CO emission amount') emitted from the engine 10 during the catalyst heat retention control (the MAF restriction control) is set therein in advance by an experiment and the like. In a case where the catalyst heat retention control is executed at the idle operating state and the forced regeneration flag $F_{DPF}$, the SOx purge flag $F_{SP}$ and the NOx purge flag $F_{NP}$ are all off ($F_{DPF}$=0, $F_{SP}$=0, $F_{NP}$=0), the idle MAF restriction-time CO emission amount read from the idle MAF restriction-time CO map 843 based on the engine revolution Ne and the MAF sensor value is transmitted to the respective heat generation amount estimation units 88A, 88B.

A filter forced regeneration-time HC map 85A is a map that is referred to based on the operating state of the engine 10, and a HC amount (hereinafter, referred to as 'filter regeneration-time HC emission amount') emitted from the engine 10 during implementation of the filter forced regeneration control is set therein in advance by an experiment and the like. In a case where the filter forced regeneration flag $F_{DPF}$ is on ($F_{DPF}$=1), the filter regeneration-time HC emission amount read from the filter forced regeneration-time HC map 85A based on the engine revolution Ne and the accelerator opening degree Q is multiplied by a predetermined correction coefficient corresponding to the operating state of the engine 10, which is then transmitted to the respective heat generation amount estimation units 88A, 88B.

A filter forced regeneration-time CO map 85B is a map that is referred to based on the operating state of the engine 10, and a CO amount (hereinafter, referred to as 'filter regeneration-time CO emission amount') emitted from the engine 10 during implementation of the filter forced regeneration control is set therein in advance by an experiment and the like. In a case where the filter forced regeneration flag $F_{DPF}$ is on ($F_{DPF}$=1), the filter regeneration-time CO emission amount read from the filter forced regeneration-time CO map 85B based on the engine revolution Ne and the accelerator opening degree Q is multiplied by a predetermined correction coefficient corresponding to the operating state of the engine 10, which is then transmitted to the respective heat generation amount estimation units 884, 88B.

A first SOx purge-time HC map 86A is a map that is referred to based on the operating state of the engine 10, and a HC amount (hereinafter, referred to as 'first SOx purge-time HC emission amount'), which is emitted from the engine 10 when the SOx purge control is implemented at a state where after-injection is included in an injection pattern of the in-cylinder injector 11, is set therein in advance by an experiment and the like. In a case where the SOx purge flag $F_{SP}$ is on ($F_{SP}$=1) and the injection pattern of the in-cylinder injector 11 includes after-injection, the first SOx purge-time HC emission amount read from the first SOx purge-time HC map 86A based on the engine revolution Ne and the accelerator opening degree Q is multiplied by a predetermined correction coefficient, which is then transmitted to the respective heat generation amount estimation units 884, 88B.

A second SOx purge-time HC map 86B is a map that is referred to based on the operating state of the engine 10, and a HC amount (hereinafter, referred to as 'second SOx purge-time HC emission amount'), which is emitted from the engine 10 when the SOx purge control is implemented at a state where after-injection is not included in the injection pattern of the in-cylinder injector 11, is set therein in advance by an experiment and the like. In a case where the SOx purge flag $F_{SP}$ is on ($F_{SP}$=1) and the injection pattern of the in-cylinder injector 11 does not include after-injection, the second SOx purge-time HC emission amount read from the second SOx purge-time HC map 86B based on the engine revolution Ne and the accelerator opening degree Q is multiplied by a predetermined correction coefficient, which is then transmitted to the respective heat generation amount estimation units 88A, 88B.

A first SOx purge-time CO map 87A is a map that is referred to based on the operating state of the engine 10, and a CO amount (hereinafter, referred to as 'first SOx purge-time CO emission amount'), which is emitted from the engine 10 when the SOx purge control is implemented at a state where after-injection is included in the injection pattern of the in-cylinder injector 11, is set therein in advance by an experiment and the like. In a case where the SOx purge flag $F_{SP}$ is on ($F_{SP}=1$) and the injection pattern of the in-cylinder injector 11 includes after-injection, the first SOx purge-time CO emission amount read from the first SOx purge-time CO map 87A based on the engine revolution Ne and the accelerator opening degree Q is multiplied by a predetermined correction coefficient, which is then transmitted to the respective heat generation amount estimation units 88A, 88B.

A second SOx purge-time CO map 87B is a map that is referred to based on the operating state of the engine 10, and a CO amount (hereinafter, referred to as 'second SOx purge-time CO emission amount'), which is emitted from the engine 10 when the SOx purge control is implemented at a state where after-injection is not included in the injection pattern of the in-cylinder injector 11, is set therein in advance by an experiment and the like. In a case where the SOx purge flag $F_{SP}$ is on ($F_{SP}=1$) and the injection pattern of the in-cylinder injector 11 does not include after-injection, the second SOx purge-time CO emission amount read from the second. SOx purge-time CO map 87B based on the engine revolution Ne and the accelerator opening degree Q is multiplied by a predetermined correction coefficient, which is then transmitted to the respective heat generation amount estimation units 88A, 88B.

In the meantime, the HC/CO maps 86A to 87B for SOx purge are not limited to the two types of the maps corresponding to whether after-injection is included or not, and a plurality of maps corresponding to whether or not pilot injection and pre-injection is performed and injection timings of respective injections may also be provided.

An oxidation catalyst heat generation amount estimation unit 88A is the second heat generation amount estimation means of the present invention, and is configured to estimate a HC/CO heat generation amount (hereinafter, referred to as 'oxidation catalyst HC/CO heat generation amount') in the oxidation catalyst 31 based on the HC/CO emission amounts input from the respective maps 81A to 87B or the estimation units 83A, 83B, in correspondence to the NOx purge flag $F_{NP}$, the SOx purge flag $F_{SP}$, the forced regeneration flag $F_{DPF}$, whether or not the MAF restriction during the idling, whether the execution time period of the NOx purge is long or short, and the like. The oxidation catalyst HC/CO heat generation amount may be estimated and calculated based on a model equation including, as input values, the HC/CO emission amounts and the like transmitted from the respective maps 81A to 87B or the estimation units 83A. 83B, and a map, for example.

A NOx catalyst heat generation amount estimation unit 88B is the first heat generation amount estimation means of the present invention, and is configured to estimate a HC/CO heat generation amount (hereinafter, referred to as 'NOx catalyst HC/CO heat generation amount') in the NOx-occlusion-reduction-type catalyst 32 based on the HC/CO emission amounts input from the respective maps 82A to 87B or the estimation units 83A, 83B, in correspondence to the NOx purge flag $F_{NP}$, the SOx purge flag $F_{SP}$, the forced regeneration flag $F_{DPF}$, whether or not the MAF restriction during the idling, whether the execution time period of the NOx purge is long or short, and the like. The NOx catalyst HC/CO heat generation amount may be estimated and calculated based on a model equation including, as input values, the HC/CO emission amounts and the like transmitted from the respective maps 81A to 87B or the estimation units 83A, 83B, and a map, for example.

An oxidation catalyst temperature estimation unit 88C is the second catalyst temperature estimation means of the present invention, and is configured to estimate and calculate a catalyst temperature of the oxidation catalyst 31 (hereinafter, referred to as 'oxidation catalyst temperature') based on a model equation including, as input values, an oxidation catalyst entry temperature detected by the first exhaust gas temperature sensor 43, the oxidation catalyst HC/CO heat generation amount input from the oxidation catalyst heat generation amount estimation unit 88A, a sensor value of the MAF sensor 40, a heat radiation amount to the exterior air estimated from a sensor value of the outside air temperature sensor 47 or the intake air temperature sensor 48 and the like, and a map, for example.

In the meantime, at the monitoring state where the engine 10 stops the fuel injection, an exothermic reaction of HC/CO in the oxidation catalyst 31 does not occur or is negligibly lowered. For this reason, at the motoring state, the oxidation catalyst temperature is estimated and calculated based on an oxidation catalyst entry temperature, a sensor value of the MAF sensor and a heat radiation amount to the exterior air without using the oxidation catalyst HC/CO heat generation amount input from the oxidation catalyst heat generation amount estimation unit 88A.

A NOx catalyst temperature estimation unit 88D is the first catalyst temperature estimation means of the present invention, and is configured to estimate and calculate a catalyst temperature of the NOx-occlusion-reduction-type catalyst 32 (hereinafter, referred to as 'NOx catalyst temperature'), based on a model equation including, as input values, an oxidation catalyst temperature (hereinafter, referred to as 'NOx catalyst entry temperature') input from the oxidation catalyst temperature estimation unit 88A, a NOx catalyst HC/CO heat generation amount input from the NOx catalyst heat generation amount estimation unit 88B, a heat radiation amount to the exterior air estimated from a sensor value of the outside air temperature sensor 47 or the intake air temperature sensor 48 and the like, and a map, for example.

In the meantime, at the monitoring state where the engine 10 stops the fuel injection, an exothermic reaction of HC/CO in the NOx-occlusion-reduction-type catalyst 32 does not occur or is negligibly lowered. For this reason, at the motoring state, the NOx catalyst temperature is estimated and calculated based on a NOx catalyst entry temperature, a sensor value of the MAF sensor and a heat radiation amount to the exterior air without using the NOx catalyst HC/CO heat generation amount input from the NOx catalyst heat generation amount estimation unit 88B.

In this way, in the illustrative embodiment, the HC/CO maps 81A to 87B and the like are appropriately switched in correspondence to the respective operating states such as the normal lean operation, the idle operation in which the catalyst heat retention control (MAF restriction) is implemented, the filter forced regeneration, the SOx purge, the NOx purge and the like in which the HC/CO emission amounts are different, so that it is possible to accurately calculate the HC/CO heat generation amounts in the catalysts corresponding to the operating states. Therefore, it is possible to effectively improve the temperature estimation accuracy of the respective catalysts 31, 32.

Also, during the SOx purge, the respective maps 86A to 87B are appropriately switched in correspondence to the multi-injection pattern of the in-cylinder injector 11, for example, implementation of after-injection where the HC/CO heat generation amounts in the respective catalysts 31, 32 are increased, so that it is possible to accurately calculate the HC/CO heat generation amounts corresponding to the multi-injection pattern. Therefore, it is possible to effectively improve the catalyst temperature estimation accuracy during the SOx purge.

Also, during the NOx purge, in correspondence to the execution time period thereof, for example, during the extended-period NOx purge, the maps 82A, 82B are used and during the short-period NOx purge for which it is difficult make a map, the method of multiplying the values of the lean-time maps 81A, 81B by the coefficients is concurrently used, so that it is possible to accurately calculate the HC/CO heat generation amounts corresponding to the long and short execution time periods of the NOx purge. Therefore, it is possible to effectively improve the catalyst temperature estimation accuracy during the NOx purge.

Also, during the motoring, the catalyst temperature is calculated based on the catalyst entry temperature, the MAF value and the heat radiation amount to the outside air, without considering the HC/CO heat generation amounts. Therefore, it is possible to effectively estimate the temperatures of the respective catalysts 31, 32 even during the motoring.

[FB Control Reference Temperature Selection]

The reference temperature selection unit 89 shown in FIG. 10 is configured to select a reference temperature that is used for the temperature feedback control of the filter forced regeneration and SOx purge.

In the exhaust gas purification system including the oxidation catalyst 31 and the NOx-occlusion-reduction-type catalyst 32, the HC/CO heat generation amounts are different in the respective catalysts 31, 32, in correspondence to heat generation characteristics and the like of the catalysts. For this reason, as the reference temperature of the temperature feedback control, it is preferably to select a temperature of the catalyst having a greater heat generation amount, from a standpoint of improving controllability.

The reference temperature selection unit 89 is configured to select a temperature of the catalyst, which has a greater heat generation amount estimated from the operating state of the engine 10, of the oxidation catalyst temperature and the NOx catalyst temperature, and to transmit the selected catalyst temperature to the filter regeneration control unit 51 and the SOx purge control unit 60, as the reference temperature of the temperature feedback control. More specifically, during the filter forced regeneration in which an oxygen concentration in the exhaust gas is relatively high and the HC/CO heat generation amount of the oxidation catalyst 31 increases, the oxidation catalyst temperature that is input from the oxidation catalyst temperature estimation unit 88A is selected as the reference temperature of the temperature feedback control. On the other hand, during the SOx purge rich control or the NOx purge rich control in which the HC/CO heat generation amount of the NOx-occlusion-reduction-type catalyst 32 increases due to reduction of the oxygen concentration in the exhaust gas, the NOx catalyst temperature that is input from the NOx catalyst temperature estimation unit 88B is selected as the reference temperature of the temperature feedback control In this way, in the illustrative embodiment, the temperature of the catalyst having a greater HC/CO heat generation amount is selected as the reference temperature of the temperature feedback control, so that it is possible to effectively improve the controllability.

[Disabling of Oxidation Catalyst Heat Generation Amount Estimation and Oxidation Catalyst Temperature Estimation]

The catalyst temperature estimation unit 80 includes a switch 801 (the switching means) configured to switch on and off of an input of following information (1) to (14) to the oxidation catalyst heat generation amount estimation unit 88A: (1) a lean-time HC emission amount input from the lean-time HC map 81A; (2) a lean-time CO emission amount input from the lean-time CO map 81B; (3) a value obtained by multiplying an extended-period NOx purge-time HC emission amount, which is input from the extended-period NOx purge-time HC map 82A, by a predetermined correction coefficient; (4) a value obtained by multiplying an extended-period NOx purge-time CO emission amount, which is input from the extended-period NOx purge-time CO map 829, by a predetermined correction coefficient; (5) an idle MAF restriction-time HC emission amount input from the idle MAF restriction-time HC map 84A; (6) an idle MAF restriction-time CO emission amount input from the idle MAF restriction-time CO map 84B; (7) a value obtained by multiplying a filter regeneration-time HC emission amount, which is input from the filter forced regeneration-time HC map 85A, by a predetermined correction coefficient; (8) a value obtained by multiplying a filter regeneration-time CO emission amount, which is input from the filter forced regeneration-time CO map 85B, by a predetermined correction coefficient; (9) a value obtained by multiplying a first SOx purge-time HC emission amount, which is input from the first SOx purge-time HC map 86A, by a predetermined correction coefficient; (10) a value obtained by multiplying a second SOx purge-time HC emission amount, which is input from the second SOx purge-time HC map 86B, by a predetermined correction coefficient; (11) a value obtained by multiplying a first SOx purge-time CO emission amount, which is input from the first SOx purge-time CO map 87A, by a predetermined correction coefficient; (12) a value obtained by multiplying a second SOx purge-time CO emission amount, which is input from the second SOx purge-time CO map 87B, by a predetermined correction coefficient; (13) a short-period NOx purge-time HC emission amount input from the short-period NOx purge-time HC estimation unit 83A; and (14) a short-period NOx purge-time CO emission amount input from the short-period NOx purge-time CO estimation unit 83B.

Also, the catalyst temperature estimation unit 80 includes a switch 802 (the switching means) configured to switch on and off of an input of following information (15) to (19) to the oxidation catalyst temperature estimation unit 88C: (15) an oxidation catalyst HC/CO heat generation amount input from the oxidation catalyst heat generation amount estimation unit 88A; (16) an oxidation catalyst entry temperature input from the first exhaust gas temperature sensor 43; (17) a sensor value input from the MAF sensor 40; (18) a sensor value input from the outside air temperature sensor 47; and (19) a sensor value input from the intake air temperature sensor 48.

Also, the catalyst temperature estimation unit 80 includes a switch 803 (the switching means) configured to switch on and off of an input of the oxidation catalyst temperature from the oxidation catalyst temperature estimation unit 88C to the reference temperature selection unit 89.

In a case where the switches 801, 802, 803 are set to the off-states, so that the processing in the oxidation catalyst heat generation amount estimation unit 88A and the oxidation catalyst temperature estimation unit 88C is not executed and the oxidation catalyst temperature is not input from the oxidation catalyst temperature estimation unit 88C, the reference temperature selection unit 89 transmits the NOx catalyst temperature input from the NOx catalyst temperature estimation unit 88D to the filter regeneration control unit 51 and the SOx purge control unit 60, as the reference temperature of the temperature feedback control.

That is, in the illustrative embodiment, the switches 801, 802, 803 are switched, so that an enabled state, in which the processing of the oxidation catalyst heat generation amount estimation unit 88A and the oxidation catalyst temperature estimation unit 88C and the processing of the reference temperature selection unit 89 based on results of the processing are executed, and a disabled state, in which the processing of the oxidation catalyst heat generation amount estimation unit 88A and the oxidation catalyst temperature estimation unit 88C is not executed and the processing of the reference temperature selection unit 89 not based on results of the processing is executed, are selected.

Figure 11:
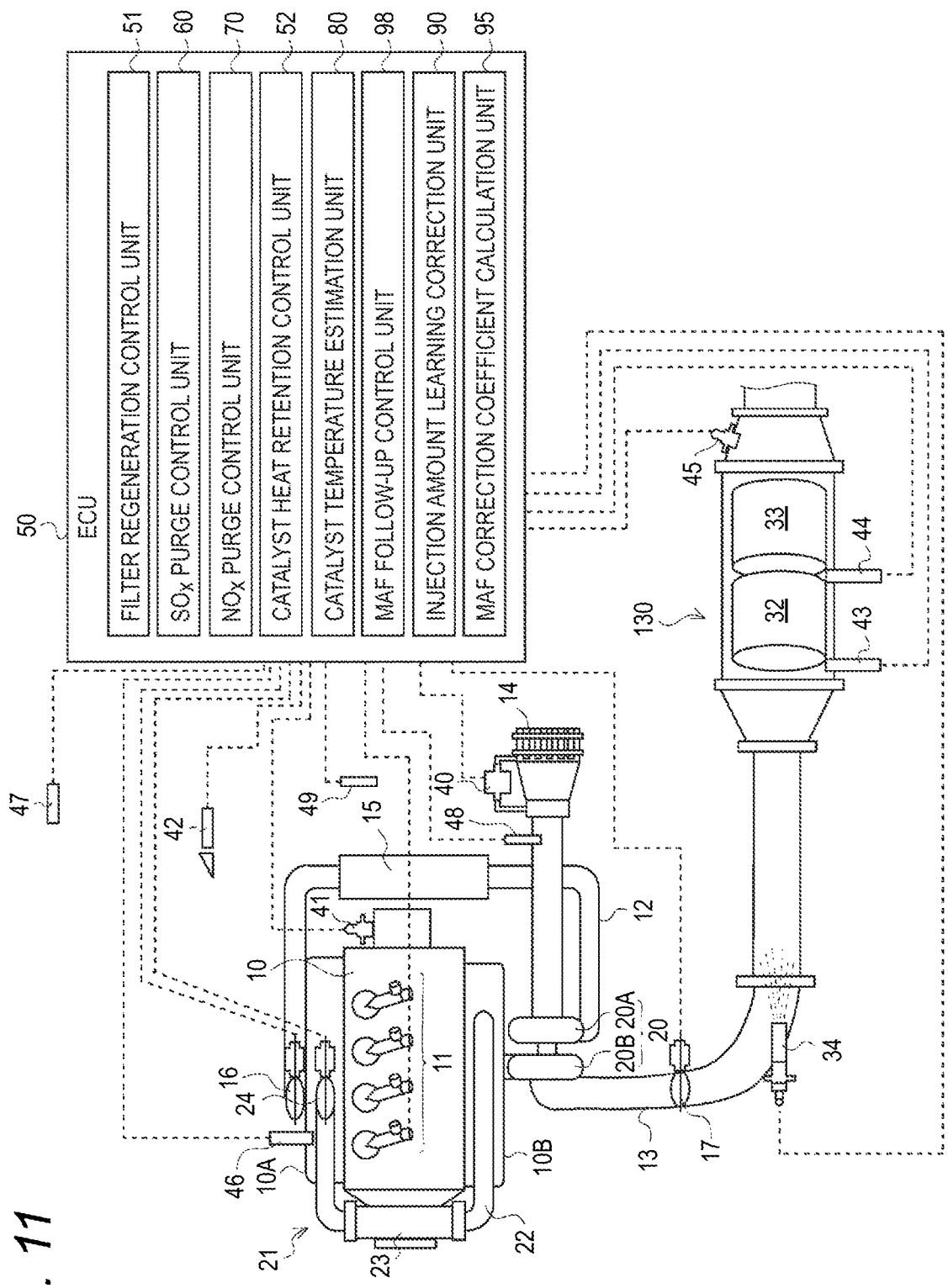
FIG. 11 is an overall configuration view depicting an exhaust gas purification system to which the control device in accordance with the illustrative embodiment is applied.

Here, as shown in FIG. 11, the ECU 50 of the illustrative embodiment is also applied to an exhaust gas purification system including an exhaust gas after-treatment device 130 in which the oxidation catalyst is not provided. In this case, the ECU 50 is used at a state where the switches 801, 802, 803 are set to the off-states and the catalyst temperature estimation unit 80 is thus set to the disabled state. In the meantime, as shown in FIG. 1, in a case where the ECU 50 of the illustrative embodiment is applied to the exhaust gas purification system including the exhaust gas after-treatment device 30 in which the oxidation catalyst 31 is provided, the ECU is used at a state where the switches 801, 802, 803 are set to the on-states and the catalyst temperature estimation unit 80 is thus set to the enabled state.

As described above, as the switches 801, 802, 803 are configured to be switched, the ECU 50 of the illustrative embodiment can be applied to not only the exhaust gas purification system including the exhaust gas after-treatment device 30 in which the oxidation catalyst 31 is provided but also the exhaust gas purification system including the exhaust gas after-treatment device 130 in which the oxidation catalyst is not provided. Therefore, since the ECU 50 can be commonly used in the exhaust gas purification system including the exhaust gas after-treatment device 30 in which the oxidation catalyst 31 is provided and the exhaust gas purification system including the exhaust gas after-treatment device 130 in which the oxidation catalyst is not provided, it is possible to save the manufacturing cost of the ECU 50.

[MAF Follow-Up Control]

The MAF follow-up control unit 98 is configured to execute control (referred to as 'MAF follow-up control') of correcting a fuel injection timing and a fuel injection amount of each in-cylinder injector 11 in correspondence to MAF change (1) for a switching time period from a lean state of normal operation to a rich state by the SOx purge control or the NOx purge control and (2) for a switching time period from the rich state by the SOx purge control or the NOx purge control to the lean state of normal operation.

[Injection Amount Learning Correction]

Figure 12:
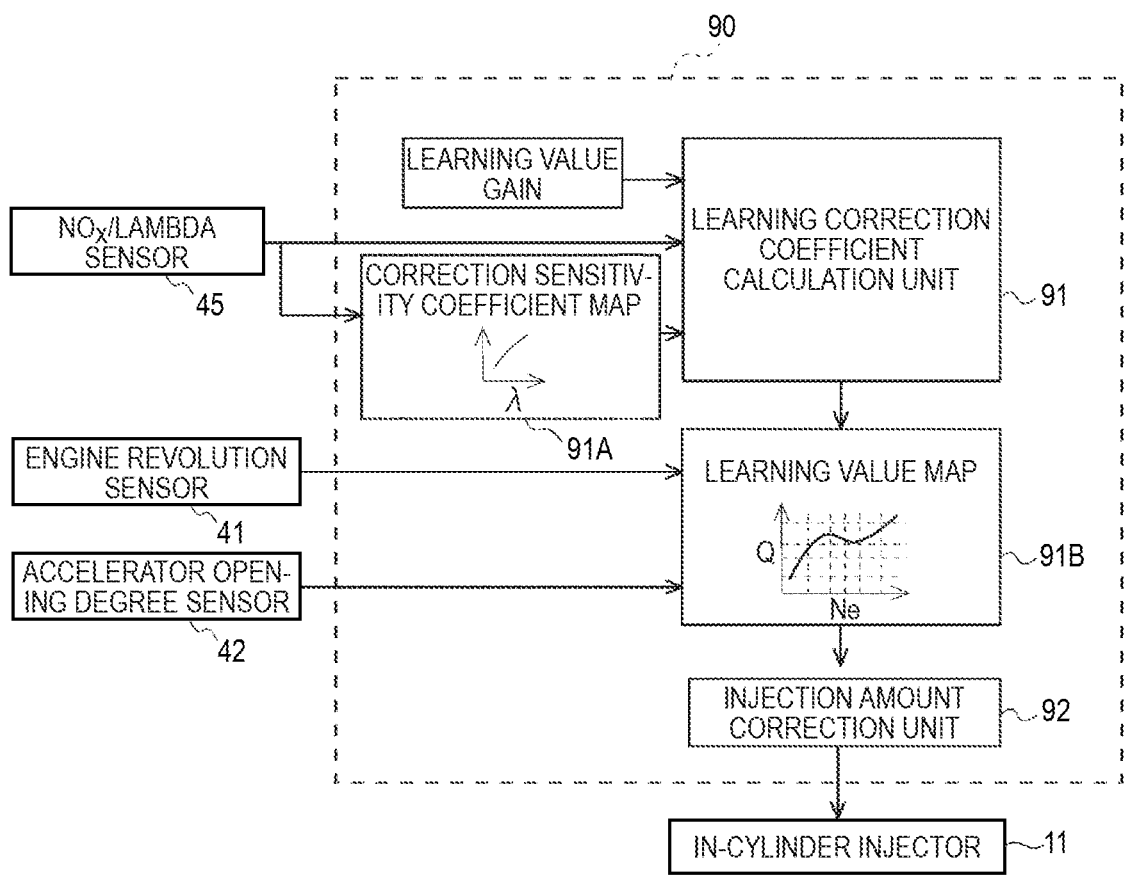
FIG. 12 is a block diagram depicting injection amount learning correction processing of an injector in accordance with the illustrative embodiment.

As shown in FIG. 12, the injection amount learning correction unit 90 includes a learning correction coefficient calculation unit 91 and an injection amount correction unit 92.

Figure 13:
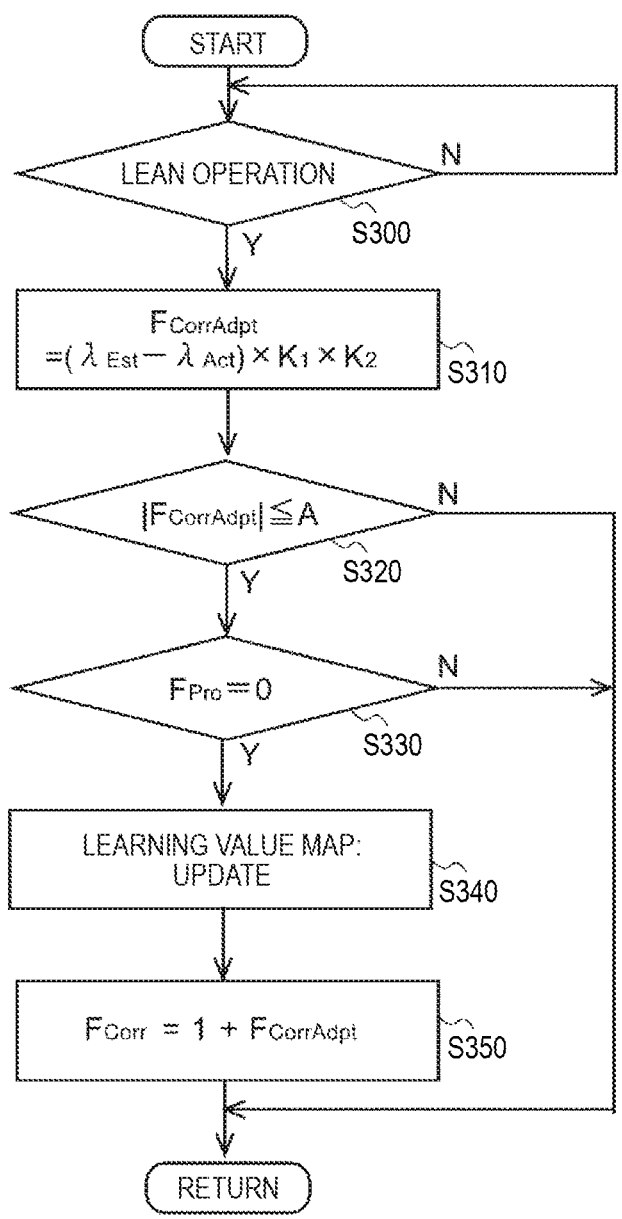
FIG. 13 is a flowchart depicting learning correction coefficient calculation processing in accordance with the illustrative embodiment.

The learning correction coefficient calculation unit 91 is configured to calculate a teaming correction coefficient $F_{Corr}$ of the fuel injection amount, based on an error $\Delta\lambda$ between an actual lambda value $\lambda_{Act}$, which is detected by the NOx/lambda sensor 45 during lean operation of the engine 10, and an estimated lambda value $\lambda_{Est}$. When the exhaust gas is in the lean state, an HC concentration in the exhaust gas is very small, so that a change in exhaust gas lambda value due to an oxidation reaction of HC in the oxidation catalyst 31 is negligible small. For this reason, it is thought that the actual lambda value $\lambda_{Act}$ in the exhaust gas, which passes through the oxidation catalyst 31 and is detected by the downstream-side NOx/lambda sensor 45, coincides with the estimated lambda value $\lambda_{Est}$ in the exhaust gas emitted from the engine 10. For this reason, in a case where the error $\Delta\lambda$ occurs between the actual lambda value $\lambda_{Act}$ and the estimated lambda value $\lambda_{Est}$, it can be assumed that the error is caused due to a difference between an instructed injection amount to each in-cylinder injector 11 and an actual injection amount. In the below, learning correction coefficient calculation processing, which is performed using the error $\Delta\lambda$, by the learning correction coefficient calculation unit 91, is described with reference to a flowchart of FIG. 13.

In step S300, it is determined whether the engine 10 is in a lean operating state, based on the engine revolution Ne and the accelerator opening degree Q. When it is determined that the engine is in the lean operating state, the learning correction coefficient calculation unit proceeds to step S310 so as to start learning correction coefficient calculation.

In step S310, a learning value $F_{CorrAdpt}$ is calculated by multiplying the error $\Delta\lambda$, which is obtained by subtracting the actual lambda value $\lambda_{Act}$ detected at the NOx/lambda sensor 45 from the estimated lambda value $\lambda_{Est}$, by a learning value gain $K_1$ and a correction sensitivity coefficient $K_2$ ($F_{CorrAdpt}=(\lambda_{Est}-\lambda_{Act})\times K_1\times K_2$). The estimated lambda value $\lambda_{Est}$ is estimated and calculated from the operating state of the engine 10 corresponding to the engine revolution Ne and the accelerator opening degree Q. Also, the correction sensitivity coefficient $K_2$ is read from a correction sensitivity coefficient map 91A shown in FIG. 11, in response to the actual lambda value $\lambda_{Act}$ detected at the NOx/lambda sensor 45, which is an input signal.

In step S320, it is determined whether an absolute value $|F_{CorrAdpt}|$ of the learning value $F_{CorrAdpt}$ is within a range of a predetermined correction limit value A. In a case where it is determined that the absolute value $|F_{CorrAdpt}|$ exceeds the correction limit value A, the control returns and this learning is stopped.

In step S330, it is determined whether a learning prohibition flag $F_{Pro}$ is off. As the learning prohibition flag $F_{Pro}$, for example, a transient operation of the engine 10, the SOx purge control ($F_{SP}=1$) and the like are exemplified. The reason is that when the corresponding conditions are satisfied, the error $\Delta\lambda$, increases due to a change in the actual lambda value $\lambda_{Act}$, so that the correct learning cannot be performed. Regarding the determination as to whether the engine 10 is in the transient operation, based on a temporal change amount of the actual lambda value $\lambda_{Act}$ detected at the NOx/lambda sensor 45, in a case where the temporal change amount is greater than a predetermined threshold value, it may be determined that the engine is in the transient operation.

In step S340, a learning value map 91B (refer to FIG. 12), which is referred to based on the engine revolution Ne and the accelerator opening degree Q, is updated to the learning value $F_{CorrAdpt}$ calculated in step S310. More specifically, in the learning value map 91B, a plurality of learning regions divided in correspondence to the engine revolution Ne and the accelerator opening degree Q is set. The learning regions are preferably set to be narrower as use frequencies thereof are higher and to be wider as use frequencies thereof are lower. Thereby, the learning accuracy is improved in the region of which use frequency is high and it is possible to effectively prevent the non-learning in the region of which use frequency is low.

In step S350, in response to the engine revolution Ne and the accelerator opening degree Q, which are input signals, "1" is added to the learning value read from the learning value map 91B, so that a learning correction coefficient $F_{Corr}$, is calculated ($F_{Corr}=1+F_{CorrAdpt}$). The learning correction coefficient $F_{Corr}$ is input to the injection amount correction unit 92 shown in FIG. 12.

The injection amount correction unit 92 multiplies respective basic injection amounts of pilot injection $Q_{Pilot}$, pre-injection $Q_{Pre}$, main injection $Q_{Main}$, after-injection $Q_{After}$, and post injection $Q_{Post}$ by the learning correction coefficient $F_{Corr}$, thereby correcting the fuel injection amounts.

In this way, the fuel injection amount to each in-cylinder injector 11 is corrected by the learning value corresponding to the error $\Delta\lambda$ between the estimated lambda value $\lambda_{Est}$ and the actual lambda value $\lambda_{Act}$, so that it is possible to effectively exclude the non-uniformity such as aging degradation, characteristic change, individual difference and the like of each in-cylinder injector 11.

[MAF Correction Coefficient]

The MAF correction coefficient calculation unit 95 is configured to calculate an MAF correction coefficient $Maf_{\_corr}$, which is used for the setting of the MAF target value $MAF_{SPL\_Trgt}$ and the target injection amount $Q_{SPR\_Trgt}$ during the SOx purge control.

In the illustrative embodiment, the fuel injection amount of each in-cylinder injector 11 is corrected based on the error $\Delta\lambda$ between the actual lambda value $\lambda_{Act}$ detected at the NOx/lambda sensor 45 and the estimated lambda value $\lambda_{Est}$. However, since the lambda is a ratio of air and fuel, it cannot be said that the error $\Delta\lambda$ is necessarily caused due to the difference between the instructed injection amount to each in-cylinder injector 11 and the actual injection amount. That is, the error $\Delta\lambda$ of the lambda may be influenced not only by each in-cylinder injector 11 but also an error of the MAF sensor 40.

Figure 14:
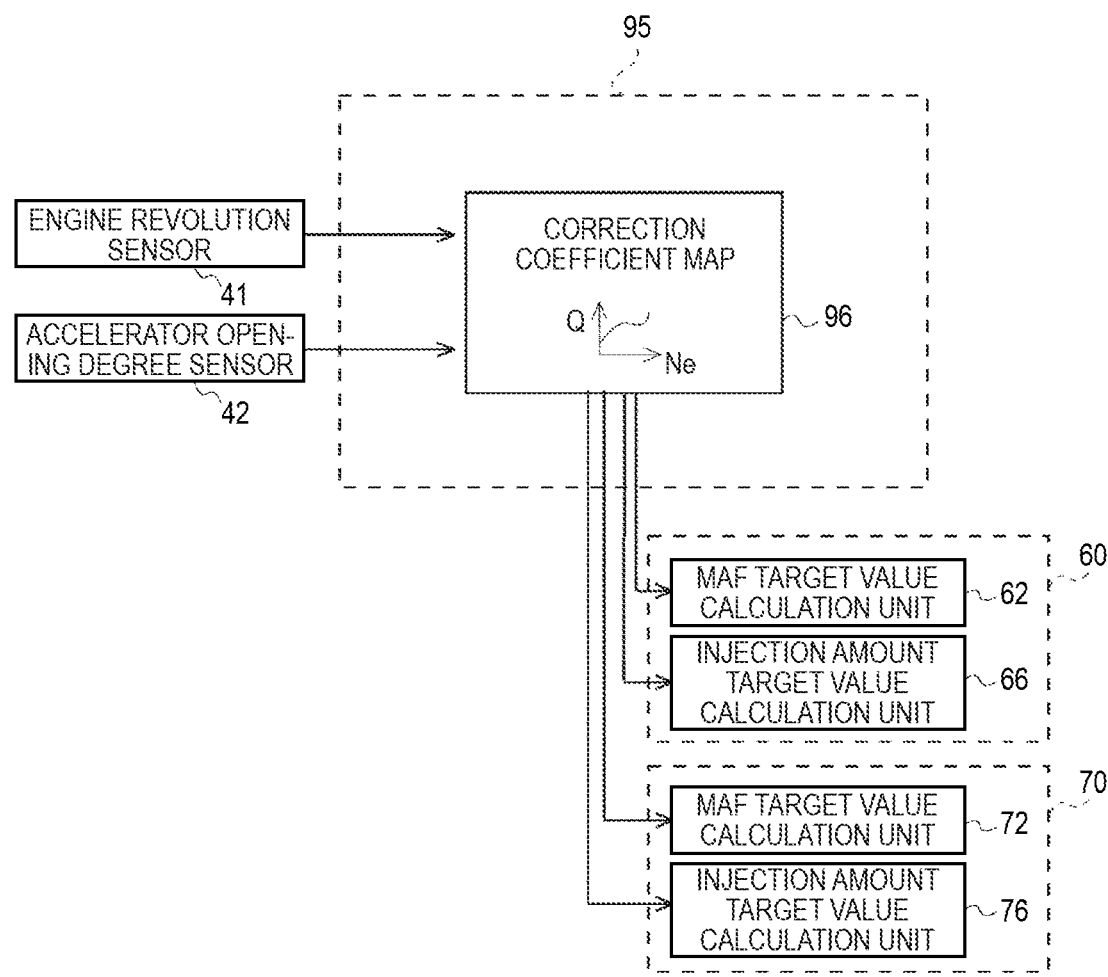
FIG. 14 is a block diagram depicting setting processing of an MAF correction coefficient in accordance with the embodiment.

FIG. 14 is a block diagram depicting setting processing of the MAF correction coefficient $Maf_{\_corr}$ which is performed by the MAF correction coefficient calculation unit 95. A correction coefficient setting map 96 is a map that is referred to based on the engine revolution Ne and the accelerator opening degree Q, and an MAF correction coefficient $Maf_{\_corr}$ indicative of a sensor characteristic of the MAP sensor 40 corresponding to the engine revolution Ne and the accelerator opening degree Q is set in advance by an experiment and the like.

The MAF correction coefficient calculation unit 95 is configured to read the MAF correction coefficient $Maf_{\_corr}$ from the correction coefficient setting map 96, in response to the engine revolution Ne and the accelerator opening degree Q, which are input signals, and to transmit the MAF correction coefficient $Maf_{\_corr}$ to the MAF target value calculation unit 62 and the injection amount target value calculation unit 66. Thereby, it is possible to effectively reflect the sensor characteristics of the MAF sensor 40 when setting the MAF target value $MAF_{SPL\_Trgt}$ and the target injection amount $Q_{SPR\_Trgt}$ during the SOx purge control.

[Others]

In the meantime, the present invention is not limited to the above illustrative embodiment and can be implemented with being appropriately modified without departing from the gist of the present invention.

The subject application is based on a Japanese Patent Application No. 2015-042700 filed on Mar. 4, 2015, the entire contents of which are incorporated herein by reference.

INDUSTRIAL APPLICABILITY

The control device of an internal combustion engine of the present invention is useful, in that the control device can be applied to the exhaust gas purification system in which the oxidation catalyst is provided and the exhaust gas purification system in which the oxidation catalyst is not provided and can effectively improve the estimation accuracy of the catalyst temperature during the catalyst regeneration processing and save the manufacturing cost thereof.

REFERENCE SIGNS LIST

10: engine
11: in-cylinder injector
12: intake passage
13: exhaust gas passage
16: intake air throttle valve
24: EGR valve
31: oxidation catalyst
32: NOx-occlusion-reduction-type catalyst
33: filter
34: exhaust gas injector
40: MAF sensor
45: NOx/lambda sensor
50: ECU

The invention claimed is:

1. A control device of an internal combustion engine, the control device comprising:
   a controller including a non-transitory computer readable medium having stored thereon;
   catalyst regeneration means for executing a catalyst regeneration processing of enriching exhaust gas to reduce and purify NOx occluded in a NOx-occlusion-reduction catalyst;
   first emission amount storing means for storing therein a relationship between at least one of a hydrocarbon amount and a carbon monoxide amount which is emitted from the internal combustion engine, and an operating state of the internal combustion engine during the execution of the catalyst regeneration processing;
   first heat generation amount estimation means for estimating at least one of a hydrocarbon heat generation amount and a carbon monoxide heat generation amount in the NOx-occlusion-reduction catalyst by using the at least one of the hydrocarbon amount and the carbon monoxide amount which is read from the first emission amount storing means based on the operating state of the internal combustion engine during the execution of the catalyst regeneration processing;
   first catalyst temperature estimation means for estimating a catalyst temperature of the NOx-occlusion-reduction catalyst during the execution of the catalyst regeneration processing based on the at least one of the hydrocarbon heat generation amount and the carbon monoxide heat generation amount estimated by the first heat generation amount estimation means;

second emission amount storing means for storing therein at least one of the hydrocarbon amount and the carbon monoxide amount emitted from the internal combustion engine during lean operation of the internal combustion engine based on the operating state of the internal combustion engine;

second heat generation amount estimation means for, during the execution of the catalyst regeneration processing, estimating at least one of a hydrocarbon heat generation amount and a carbon monoxide heat generation amount in an oxidation catalyst based on the at least one of the hydrocarbon amount and the carbon monoxide amount read from the second emission amount storing means in a case where an execution time period of the catalyst regeneration processing is shorter than a predetermined time period, and estimating the at least one of the hydrocarbon heat generation amount and the carbon monoxide heat generation amount in the oxidation catalyst by using the at least one of the hydrocarbon amount and the carbon monoxide amount read from the first emission amount storing means based on the operating state of the internal combustion engine in a case where the execution time period of the catalyst regeneration processing is equal to or longer than the predetermined time period;

second catalyst temperature estimation means for estimating a catalyst temperature of the oxidation catalyst during the execution of the catalyst regeneration processing based on the at least one of the hydrocarbon heat generation amount and the carbon monoxide heat generation amount estimated by the second heat generation amount estimation means; and switching means for switching between an enabled state in which the processing of the second heat generation amount estimation means and the second catalyst temperature estimation means are executed and a disabled state in which the processing of the second heat generation amount estimation means and the second catalyst temperature estimation means are not executed, wherein the control device is configured to be applied to both an exhaust gas purification system including the NOx-occlusion-reduction catalyst and the oxidation catalyst and the exhaust gas purification system including the NOx-occlusion-reduction catalyst and not including the oxidation catalyst.

2. The control device of an internal combustion engine according to claim 1, wherein the first heat generation amount estimation means estimates the at least one of the hydrocarbon heat generation amount and the carbon monoxide heat generation amount in the NOx-occlusion-reduction catalyst by multiplying the at least one of the hydrocarbon amount and the carbon monoxide amount read from the second emission amount storing means by a predetermined correction coefficient in a case where the execution time period of the catalyst regeneration processing is shorter than the predetermined time period, and estimates the at least one of the hydrocarbon heat generation amount and the carbon monoxide heat generation amount in the NOx-occlusion-reduction catalyst based on the at least one of the hydrocarbon amount and the carbon monoxide amount read from the first emission amount storing means in a case where the execution time period of the catalyst regeneration processing is equal to or longer than the predetermined time period.

3. A control device of an internal combustion engine, the control device comprising:

a controller including a non-transitory computer readable medium having stored thereon;

a first memory that stores therein a relationship between at least one of a hydrocarbon amount and a carbon monoxide amount which is emitted from the internal combustion engine, and an operating state of the internal combustion engine during execution of a catalyst regeneration processing of enriching exhaust gas to reduce and purify NOx occluded in a NOx-occlusion-reduction catalyst;

a second memory that stores therein at least one of the hydrocarbon amount and the carbon monoxide amount emitted from the internal combustion engine during lean operation of the internal combustion engine based on the operating state of the internal combustion engine; and the controller including the non-transitory computer readable medium further includes instructions stored thereon that, when executed by a processor:

execute the catalyst regeneration processing of enriching exhaust gas to reduce and purify NOx occluded in the NOx-occlusion-reduction catalyst;

execute a first heat generation amount estimation processing of estimating at least one of a hydrocarbon heat generation amount and a carbon monoxide heat generation amount in the NOx-occlusion-reduction-die catalyst by using the at least one of the hydrocarbon amount and the carbon monoxide amount which is read from the first memory based on the operating state of the internal combustion engine during the execution of the catalyst regeneration processing;

execute a first catalyst temperature estimation processing of estimating a catalyst temperature of the NOx-occlusion-reduction catalyst during the execution of the catalyst regeneration processing based on the at least one of the hydrocarbon heat generation amount and the carbon monoxide heat generation amount estimated by the first heat generation amount estimation processing;

execute a second heat generation amount estimation processing of, during the execution of the catalyst regeneration processing, estimating at least one of a hydrocarbon heat generation amount and a carbon monoxide heat generation amount in an oxidation catalyst based on the at least one of the hydrocarbon amount and the carbon monoxide amount read from the second memory in a case where an execution time period of the catalyst regeneration processing is shorter than a predetermined time period, and estimating the at least one of the hydrocarbon heat generation amount and the carbon monoxide heat generation amount in the oxidation catalyst by using the at least one of the hydrocarbon amount and the carbon monoxide amount read from the first memory based on the operating state of the internal combustion engine in a case where the execution time period of the catalyst regeneration processing is equal to or longer than the predetermined time period;

execute a second catalyst temperature estimation processing of estimating a catalyst temperature of the oxidation catalyst during the execution of the catalyst regeneration processing based on the at least one of the hydrocarbon heat generation amount and the carbon monoxide heat generation amount estimated by the second heat generation amount estimation process; and execute a switching process of switching between an enabled state in which the second heat generation amount estimation processing and the second catalyst temperature estimation processing are executed and a disabled state in which the second heat generation amount estimation processing and the second catalyst temperature estimation processing are not executed, wherein the control device is configured to be applied to both an exhaust gas purification system including the NOx-occlusion-reduction catalyst and the oxidation catalyst and the exhaust gas purification system including the NOx-occlusion-reduction catalyst and not including the oxidation catalyst.

4. The control device of an internal combustion engine according to claim 3, wherein, in the first heat generation amount estimation processing, the at least one of the hydrocarbon heat generation amount and the carbon monoxide heat generation amount in the NOx-occlusion-reduction catalyst is estimated by multiplying the at least one of the hydrocarbon amount and the carbon monoxide amount read from the second memory by a predetermined correction coefficient in a case where the execution time period of the catalyst regeneration processing is shorter than the predetermined time period, and the at least one of the hydrocarbon heat generation amount and the carbon monoxide heat generation amount in the NOx-occlusion-reduction catalyst is estimated based on the at least one of the hydrocarbon amount and the carbon monoxide amount read from the first memory in a case where the execution time period of the catalyst regeneration processing is equal to or longer than the predetermined time period.

* * * * *